(12) United States Patent
Mizutani et al.

(10) Patent No.: US 9,088,202 B2
(45) Date of Patent: Jul. 21, 2015

(54) VOLTAGE CONVERSION APPARATUS AND ELECTRICAL LOAD DRIVING APPARATUS TO REDUCE NOISE THROUGH MAGNETIC FIELD

(75) Inventors: Koichi Mizutani, Toyota (JP); Shinji Sekido, Okazaki (JP); Junzo Oe, Nishikamo-gun (JP); Takayuki Naito, Toyota (JP); Takashi Imai, Okazaki (JP); Kouichi Yamanoue, Hiroshima (JP); Shigeki Yamamoto, Hiroshima (JP)

(73) Assignees: TOYOTA JIDOSHA KABUSHIKI KAISHA, Toyota (JP); VISTEON GLOBAL TECHNOLOGIES, INC., Van Buren Township, MI (US)

( * ) Notice: Subject to any disclaimer, the term of this patent is extended or adjusted under 35 U.S.C. 154(b) by 0 days.

(21) Appl. No.: 12/679,617

(22) PCT Filed: Sep. 8, 2009

(86) PCT No.: PCT/JP2009/065661
§ 371 (c)(1),
(2), (4) Date: Mar. 23, 2010

(87) PCT Pub. No.: WO2010/029917
PCT Pub. Date: Mar. 18, 2010

(65) Prior Publication Data
US 2011/0148370 A1   Jun. 23, 2011

(30) Foreign Application Priority Data
Sep. 9, 2008 (JP) ................................ 2008-231527

(51) Int. Cl.
*H02M 7/00* (2006.01)
*H02M 7/538* (2007.01)

(52) U.S. Cl.
CPC .............. *H02M 7/003* (2013.01); *H02M 7/538* (2013.01)

(58) Field of Classification Search
CPC ....... H01H 47/325; H03K 3/45; H05K 3/284; H05K 1/189; H05K 3/281; H05K 1/0231; H01L 2924/01079
USPC ......... 361/152, 156, 204, 748, 760, 763, 783; 307/115, 109, 98
See application file for complete search history.

(56) References Cited

U.S. PATENT DOCUMENTS 4,228,483 A * 10/1980 Haury et al. ................... 361/729
5,627,741 A *  5/1997 Naruo et al. .................... 363/89
(Continued)

FOREIGN PATENT DOCUMENTS

JP    A 62-5695    1/1987
JP    A 4-69060    3/1992
(Continued)

OTHER PUBLICATIONS

International Search Report issued in International Application No. PCT/JP2009/065661 on Dec. 8, 2009 (with translation).

*Primary Examiner* — Jessica Han
*Assistant Examiner* — Gustavo Rosario Benitez
(74) *Attorney, Agent, or Firm* — Oliff PLC

(57) ABSTRACT

The present invention is related to a voltage conversion apparatus having a first loop circuit and a second loop circuit which share an inductance component, in which a current passes through the first and second loop circuits alternately in accordance with ON/OFF operation of a first switching element provided in the first loop circuit, characterized in that a direction of a magnetic field through the first loop circuit generated at the ON operation of the first switching element in the first loop circuit is the same as a direction of a magnetic field through the second loop circuit generated at the OFF operation of the first switching element in the first loop circuit subsequent to the ON operation.

10 Claims, 18 Drawing Sheets

(56) References Cited

U.S. PATENT DOCUMENTS

| | | | |
|---|---|---|---|
| 5,745,351 A | 4/1998 | Taurand | |
| 6,300,679 B1 * | 10/2001 | Mukerji et al. | 257/738 |
| 8,829,870 B2 * | 9/2014 | Mizutani et al. | 323/271 |
| 2005/0057445 A1 * | 3/2005 | Bezal et al. | 345/60 |
| 2006/0145753 A1 * | 7/2006 | Talbot et al. | 327/547 |
| 2008/0055946 A1 * | 3/2008 | Lesso et al. | 363/63 |
| 2008/0057623 A1 * | 3/2008 | Forman et al. | 438/107 |
| 2008/0106241 A1 * | 5/2008 | Deaver et al. | 323/209 |
| 2009/0201005 A1 | 8/2009 | Noma et al. | |

FOREIGN PATENT DOCUMENTS

| | | |
|---|---|---|
| JP | A 8-275513 | 10/1996 |
| JP | A 9-42096 | 2/1997 |
| JP | A 2000-287454 | 10/2000 |
| JP | A 2005-110452 | 4/2005 |
| JP | A 2007-274759 | 10/2007 |
| JP | WO 2008/087781 A1 | 7/2008 |

* cited by examiner

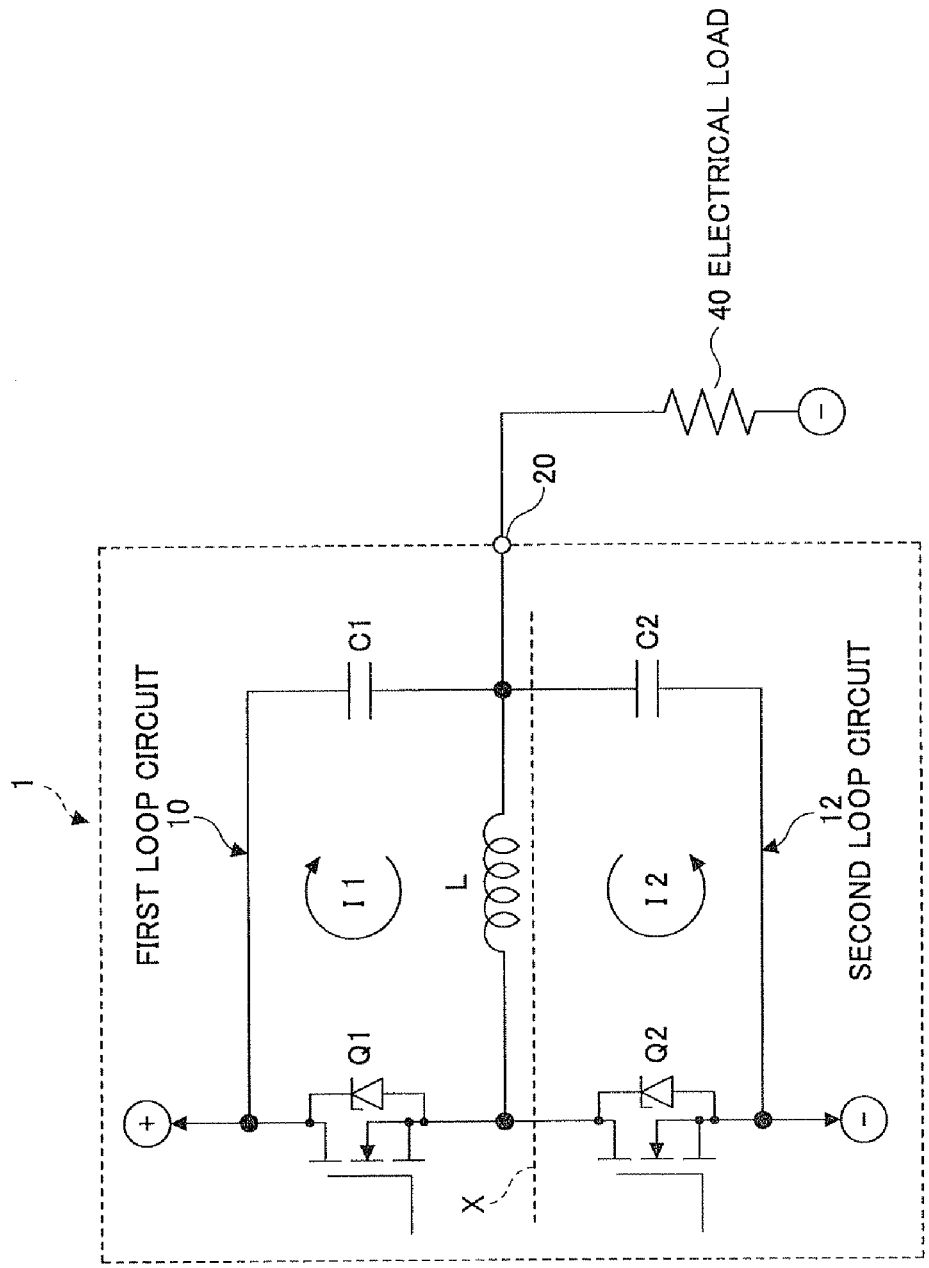

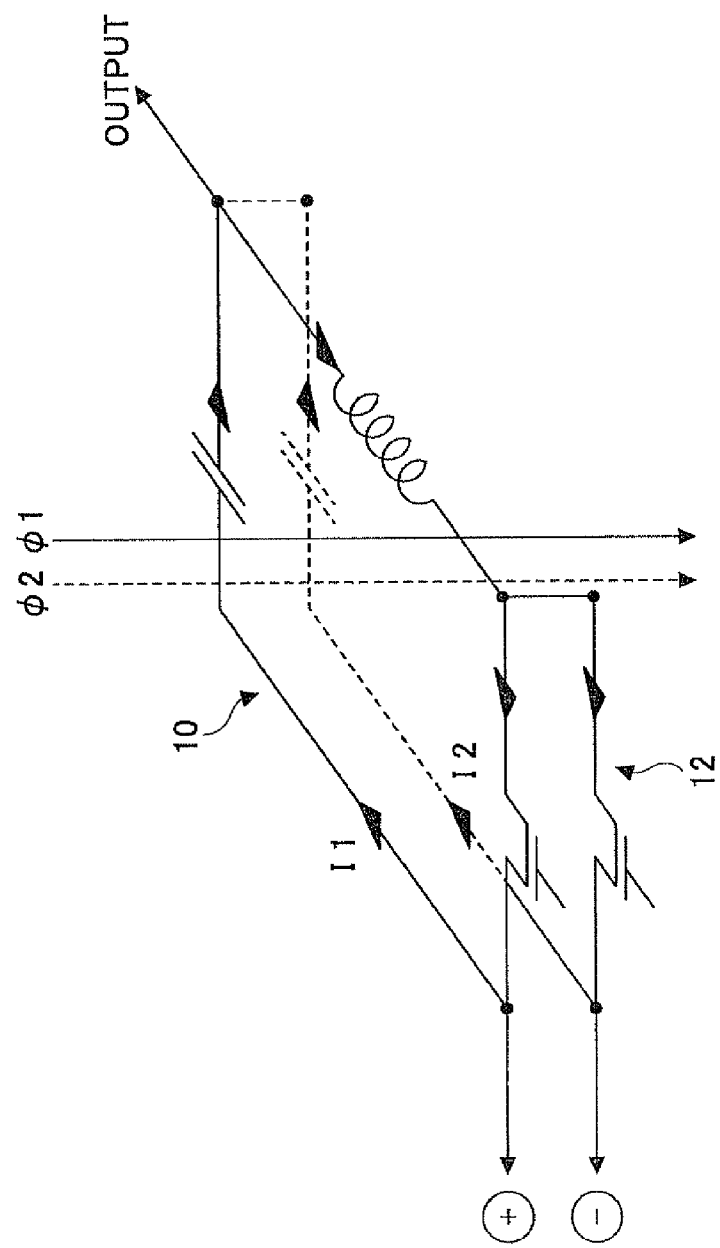

FIG.6A  I2
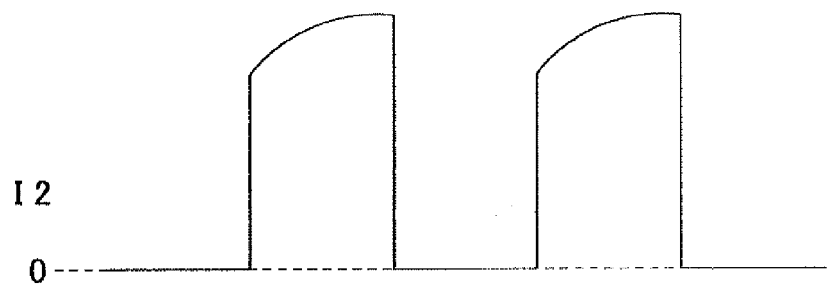
FIG.6B  I1
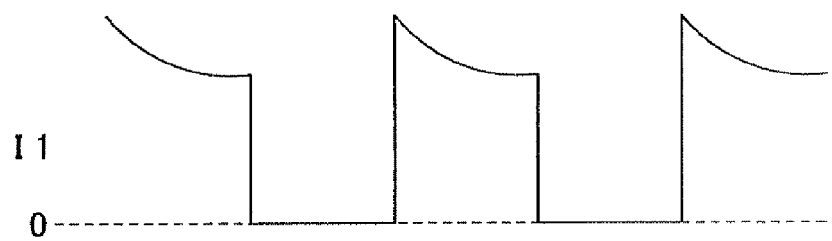
FIG.6C  φ2
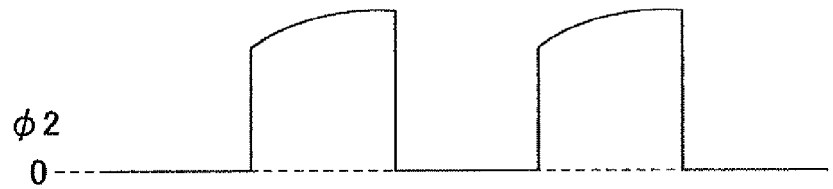
FIG.6D  φ1
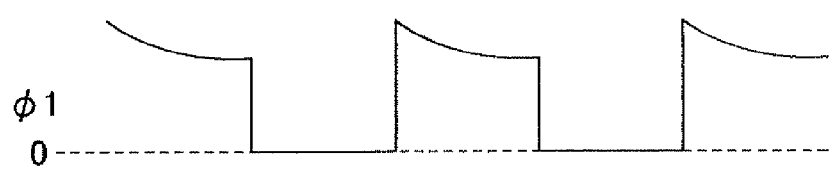
FIG.6E  φ2+φ1

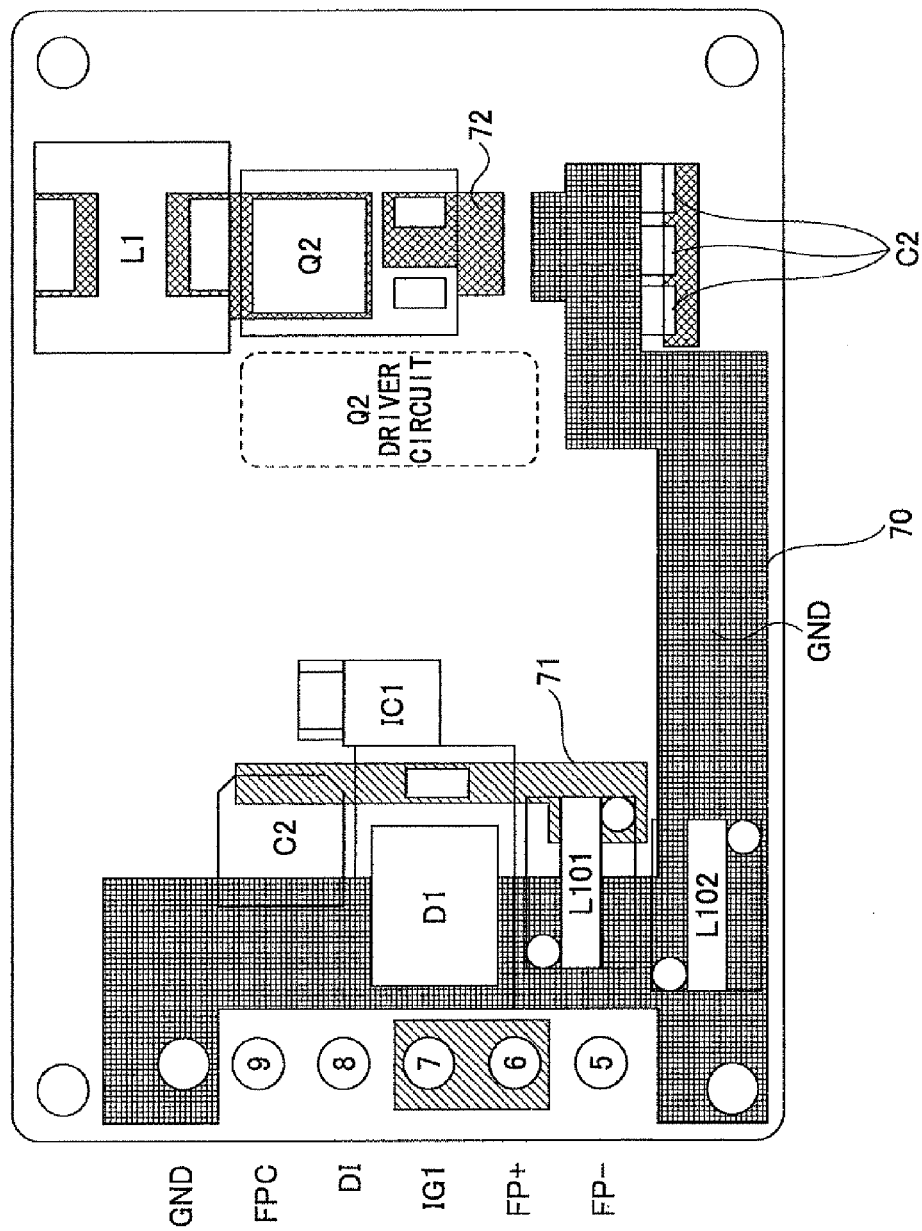

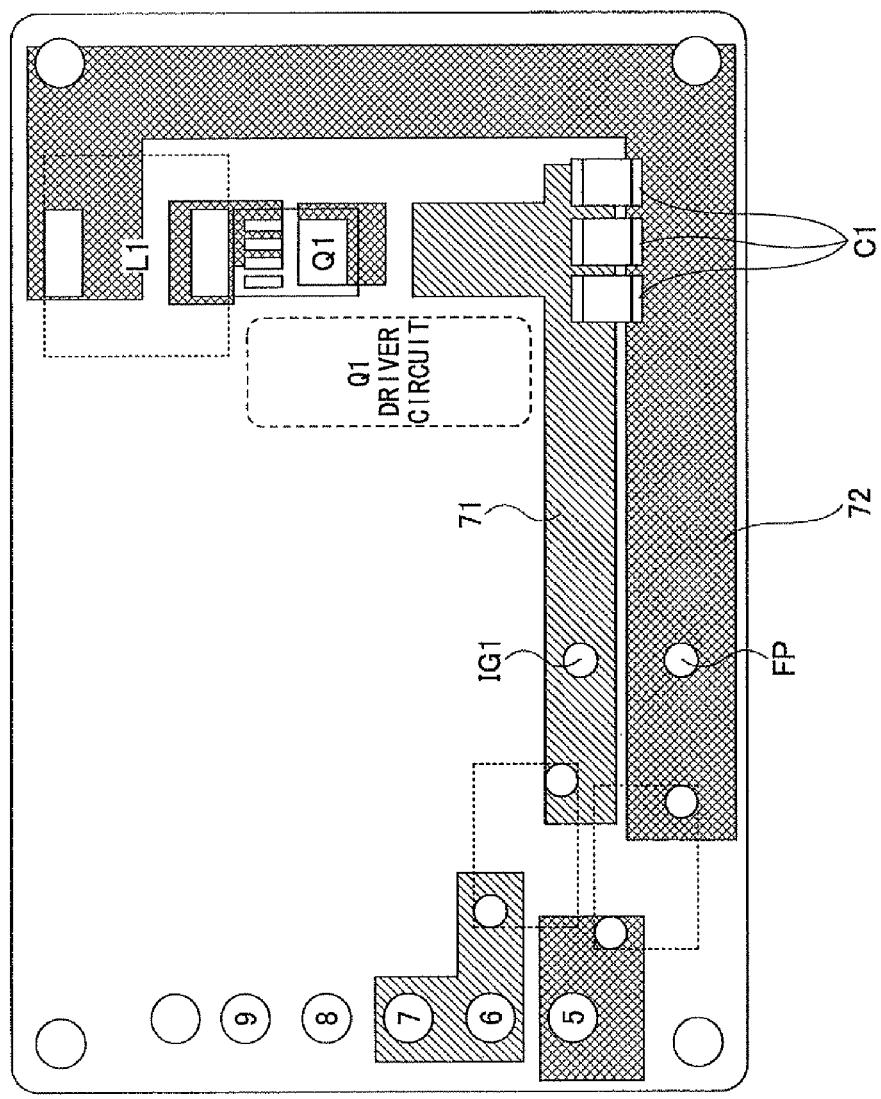

110 UNBALANCE DETECTION CIRCUIT

US 9,088,202 B2

VOLTAGE CONVERSION APPARATUS AND ELECTRICAL LOAD DRIVING APPARATUS TO REDUCE NOISE THROUGH MAGNETIC FIELD

TECHNICAL FIELD

The present invention is related to a voltage conversion apparatus having a first loop circuit and a second loop circuit which share an inductance component and is also related to an electrical load driving apparatus which uses the voltage conversion apparatus.

BACKGROUND ART

JP2005-110452 discloses a switching power supply circuit having a primary circuit connected to a primary coil of a transformer and a secondary circuit connected to a secondary coil of a transformer, wherein an electrode pattern for the primary circuit and an electrode pattern for the secondary circuit are disposed in such a manner that they are opposed to each other. An insulating layer between the electrode patterns functions as a dielectric for a capacitor and thus forms an equivalent capacitor. The equivalent capacitor functions as a capacitor for noise reduction.

A non-isolated DC-DC converter, for example, as shown in FIG. 1, is provided with a first loop circuit and a second loop circuit. The first and second loop circuits share an inductance L and have capacitors C1 and C2, respectively. A voltage conversion is implemented by turning on and off switching element Q1 or Q2 provided in the first or second loop circuit. During the switching, the first and second capacitors have functions of smoothing an output of the DC-DC converter and reducing a noise level generated by the DC-DC converter. Generally, such a circuit configuration as shown in FIG. 1 is implemented by providing the first and second loop circuits on a common surface or separate surfaces of a printed circuit board, as shown in FIG. 2.

However, in the conventional circuit configuration as shown in FIG. 1 and FIG. 2, when the first switching element Q1, for example, is operated to turn ON/OFF, the current passes through the first and second loop circuits alternately, and thus a magnetic field through the first loop circuit and a magnetic field through the second loop circuit are generated alternately. At that time, a direction of the current passing through the first loop circuit and a direction of the current passing through the second loop circuit are opposite to each other, as shown by arrows in FIG. 1, and thus a direction of the magnetic field through the first loop circuit and a direction of the magnetic field through the second loop circuit are opposite to each other. In such a configuration, magnetic fields in opposite directions are generated alternately for a short period due to a high-speed (short term) ON/OFF operation of the switching element Q1, resulting in a problem that a noise is generated due to such a variation in the magnetic field.

DISCLOSURE OF INVENTION

Therefore, an object of the present invention is to provide a voltage conversion apparatus which can effectively reduce noise due to a variation in the magnetic field variation generated in the first and second loop circuits by redesigning an arrangement of parts of the voltage conversion apparatus, and an electrical load driving apparatus which uses such a voltage conversion apparatus.

In order to achieve the aforementioned objects, according to the first aspect of the present invention a voltage conversion apparatus is provided which has a first loop circuit and a second loop circuit which share an inductance component, in which a current passes through the first and second loop circuits alternately in accordance with ON/OFF operation of a first switching element provided in the first circuit, wherein a direction of a magnetic field through the first loop circuit generated at the ON operation of the first switching element in the first circuit is the same as a direction of a magnetic field through the second loop circuit generated at the OFF operation of the first switching element in the first circuit subsequent to the ON operation.

According to the present invention, a voltage conversion apparatus and an electrical load driving apparatus using the same can be obtained, which voltage conversion apparatus can effectively reduce noise due to a variation in the magnetic field variation generated in the first and second loop circuits.

BRIEF DESCRIPTION OF THE DRAWINGS

These and other objects, features, and advantages of the present invention will become more apparent from the following detailed description of preferred embodiments given with reference to the accompanying drawings, in which:

FIG. 4 is a diagram for illustrating another example of a way of connecting an electrical load 40;

FIG. 5 is a diagram for conceptually illustrating a circuit arrangement of the voltage conversion apparatus 1 according to the embodiment of the present invention;

FIG. 6A is a diagram of waveshape for explaining a magnetic flux variation reduction effect in the voltage conversion apparatus 1 which adopts the circuit arrangement shown in FIG. 5;

FIG. 6B is a diagram of waveshape for explaining a magnetic flux variation reduction effect in the voltage conversion apparatus 1 which adopts the circuit arrangement shown in FIG. 5;

FIG. 6C is a diagram of waveshape for explaining a magnetic flux variation reduction effect in the voltage conversion apparatus 1 which adopts the circuit arrangement shown in FIG. 5;

FIG. 6D is a diagram of waveshape for explaining a magnetic flux variation reduction effect in the voltage conversion apparatus 1 which adopts the circuit arrangement shown in FIG. 5;

FIG. 6E is a diagram of waveshape for explaining a magnetic flux variation reduction effect in the voltage conversion apparatus 1 which adopts the circuit arrangement shown in FIG. 5;

FIG. 8A is a diagram for more specifically illustrating the concrete example shown in FIG. 7;

FIG. 8B is a diagram for more specifically illustrating the concrete example shown in FIG. 7;

EXPLANATION FOR REFERENCE NUMBER

Figure 1:
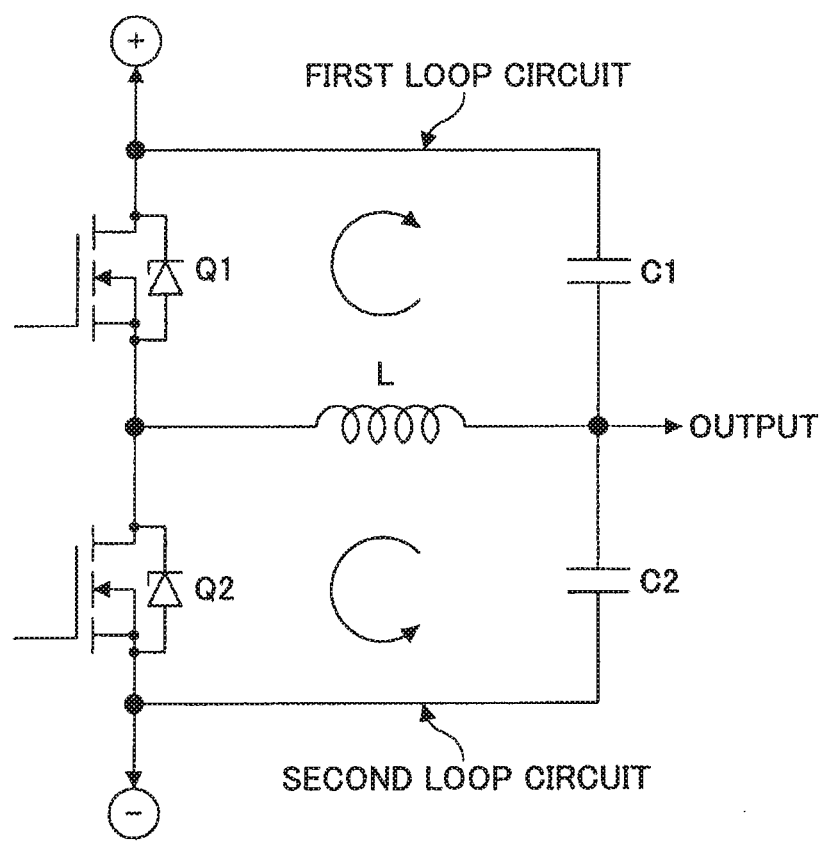
FIG. 1 is a diagram for illustrating a circuit configuration of a DC-DC converter according to prior art.

L inductance
C1 capacitor
C2 capacitor
Q1 switching element
Q2 switching element
1,2,3 voltage conversion apparatus
10 first loop circuit
12 second loop circuit
20 output terminal
40 electrical load
203 direct-current power supply

BEST MODE FOR CARRYING OUT THE INVENTION

In the following, the best mode for carrying out the present invention will be described in detail by referring to the accompanying drawings.

Figure 3:
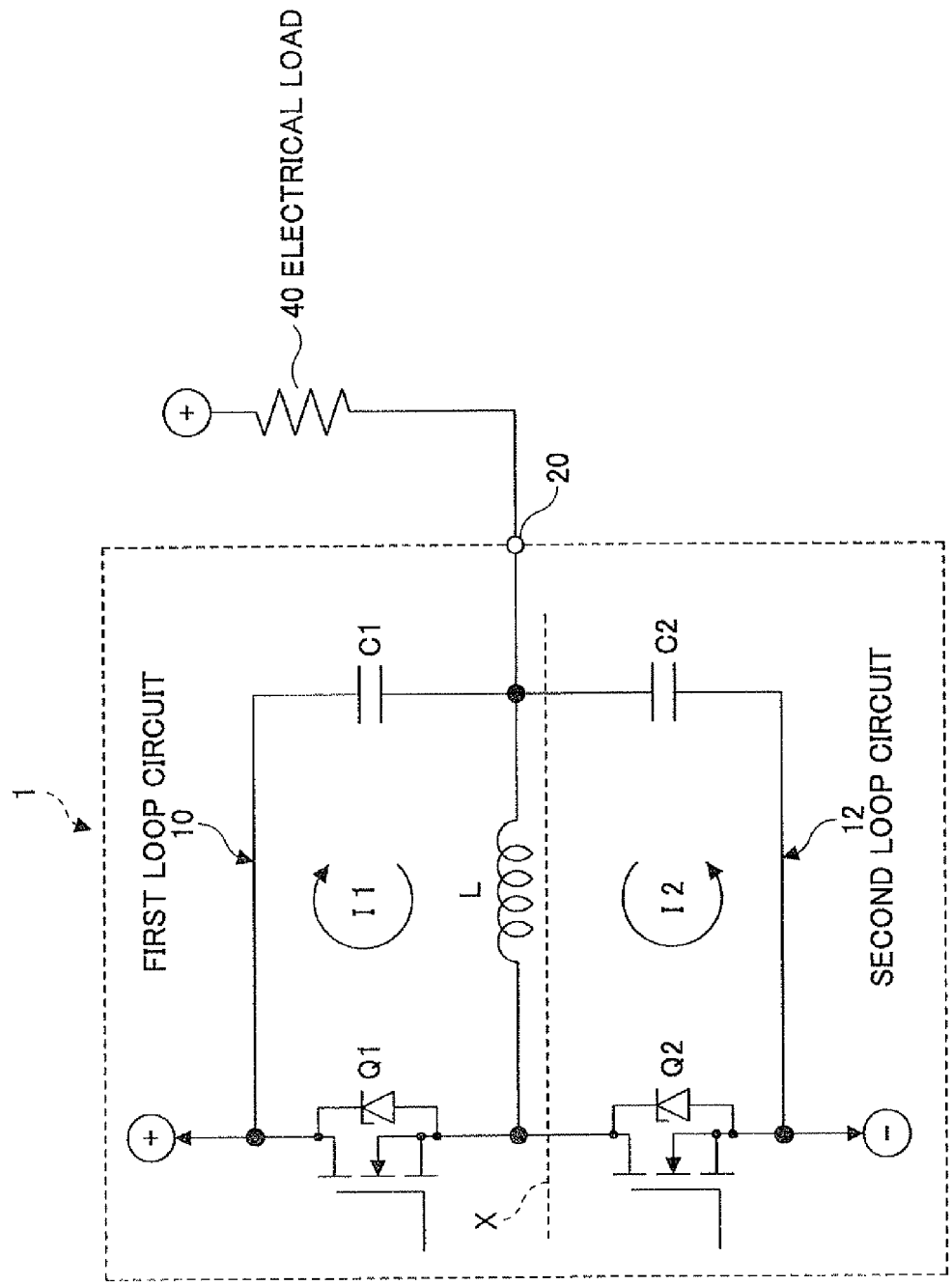
FIG. 3 is a diagram for illustrating a circuit configuration of a voltage conversion apparatus 1 according to one embodiment of the present invention.

FIG. 3 is a diagram for illustrating a circuit configuration of a voltage conversion apparatus 1 according to one embodiment of the present invention. The circuit configuration of the voltage conversion apparatus 1 according to the embodiment itself is equivalent to the circuit configuration of the conventional DC-DC converter shown in FIG. 1.

Specifically, the voltage conversion apparatus 1 is a non-isolated DC-DC converter employing synchronous rectification. The voltage conversion apparatus 1 has first and second loop circuits 10 and 12. An output terminal 20 of the voltage conversion apparatus 1 is connected to an electrical load 40 to be driven. The first and second loop circuits 10 and 12 share an inductance L.

The first loop circuit 10 has a switching element Q1 and a capacitor C1 in addition to the inductance L. The switching element Q1 is a MOSFET (metal oxide semiconductor field-effect transistor) in this example; however, the switching element Q1 may be another transistor such as an IGBT (Insulated Gate Bipolar Transistor), etc. The switching element Q1 is connected in series with respect to the inductance L between a positive terminal and the output terminal 20. Further, a drain of the switching element Q1 is connected to the positive terminal and a source of the switching element Q1 is connected to the inductance L. The capacitor C1 is connected in parallel with respect to the switching element Q1 and the inductance L between the positive terminal and the output terminal 20.

Similarly, the second loop circuit 12 has a switching element Q2 and a capacitor C2 in addition to the inductance L. The switching element Q2 is a MOSFET in this example; however, the switching element Q2 may be another transistor such as an IGBT, etc. The switching element Q2 is connected in series with respect to the inductance L between a negative terminal and the output terminal 20. Further, a drain of the switching element Q2 is connected to the inductance L and a source of the switching element Q2 is connected to the negative terminal. The capacitor C2 is connected in parallel with respect to the switching element Q2 and the inductance L between the negative terminal and the output terminal 20.

The positive terminal is connected to a first direct-current power supply (see a direct-current power supply 203 in FIG. 18), and the negative terminal is connected to a second direct-current power supply (not shown) whose voltage is lower than that of the first direct-current power supply. A rated voltage of the first direct-current power supply and a rated voltage of the second direct-current power supply are arbitrary as long as the rated voltage of the second direct-current power supply is lower than the rated voltage of the first direct-current power supply. Typically, the negative terminal is connected to a ground (i.e., 0 V). Hereafter, in order to avoid complexity of explanation, it is assumed that the negative terminal is connected to a ground, unless otherwise specified.

Mainly, the capacitors C1 and C2 have functions of smoothing an output voltage of the voltage conversion apparatus 1 and reducing a noise level generated by the voltage conversion apparatus 1. Preferably, the capacitances of the capacitors C1 and C2 are set to the same value. Further, preferably, the capacitors C1 and C2 are ceramic capacitors, which have a high resistance against aged deterioration, in order to reduce influence of the deterioration.

The switching elements Q1 and Q2 are controlled such that one of the switching elements Q1 and Q2 is turned on when the other is turned off. The details of the control manner of the switching elements Q1 and Q2 (for example, a way of setting or adjusting a dead time) may be arbitrary.

In the example shown in FIG. 3, in operation, when the switching element Q2 turns on, the switching element Q1 turns off in synchronization with it. At that time, the current I2 passes through the second loop circuit 12 in a direction indicated by an arrow in FIG. 3. When the switching element Q2 is inverted from ON state to OFF state, the switching element Q1 is also inverted from OFF state to ON state in synchronization with it. At that time, the current I1 passes through the first loop circuit 10 in a direction indicated by an arrow in FIG. 3. In this way, by appropriately controlling a time period (i.e., on-duty) for which the switching element Q2 turns on, it is possible to convert the voltage of the first direct-current power supply into a desired voltage and output it at the output terminal 20.

It is noted that in the example shown in FIG. 3, the positive terminal is connected to another terminal of the electrical load 40 (i.e., the terminal of the electrical load 40 on an opposite side with respect to the output terminal 20). Therefore, the ON/OFF operation of the switching element Q2 substantially determines the duty, and the switching element Q1 functions as a switching element for synchronous rectification. It is noted that when cost is more important than energy efficiency, for example, the switching element Q1 may be omitted. In this case, only a diode is provided instead of the switching element Q1. Further, for example, as shown in FIG. 4, the negative terminal may be connected to the other terminal of the electrical load 40 (i.e., the terminal of the electrical load 40 on an opposite side with respect to the output terminal 20). In this case, in contrast to the example shown in FIG. 3, the ON/OFF operation of the switching element Q1 substantially determines the duty, and the switching element Q2 functions as a switching element for synchronous rectification. It is noted that in the example shown in FIG. 4, when cost is more important than energy efficiency, the switching element Q2 may be omitted. In this case, only a diode is provided instead of the switching element Q2.

Figure 2:
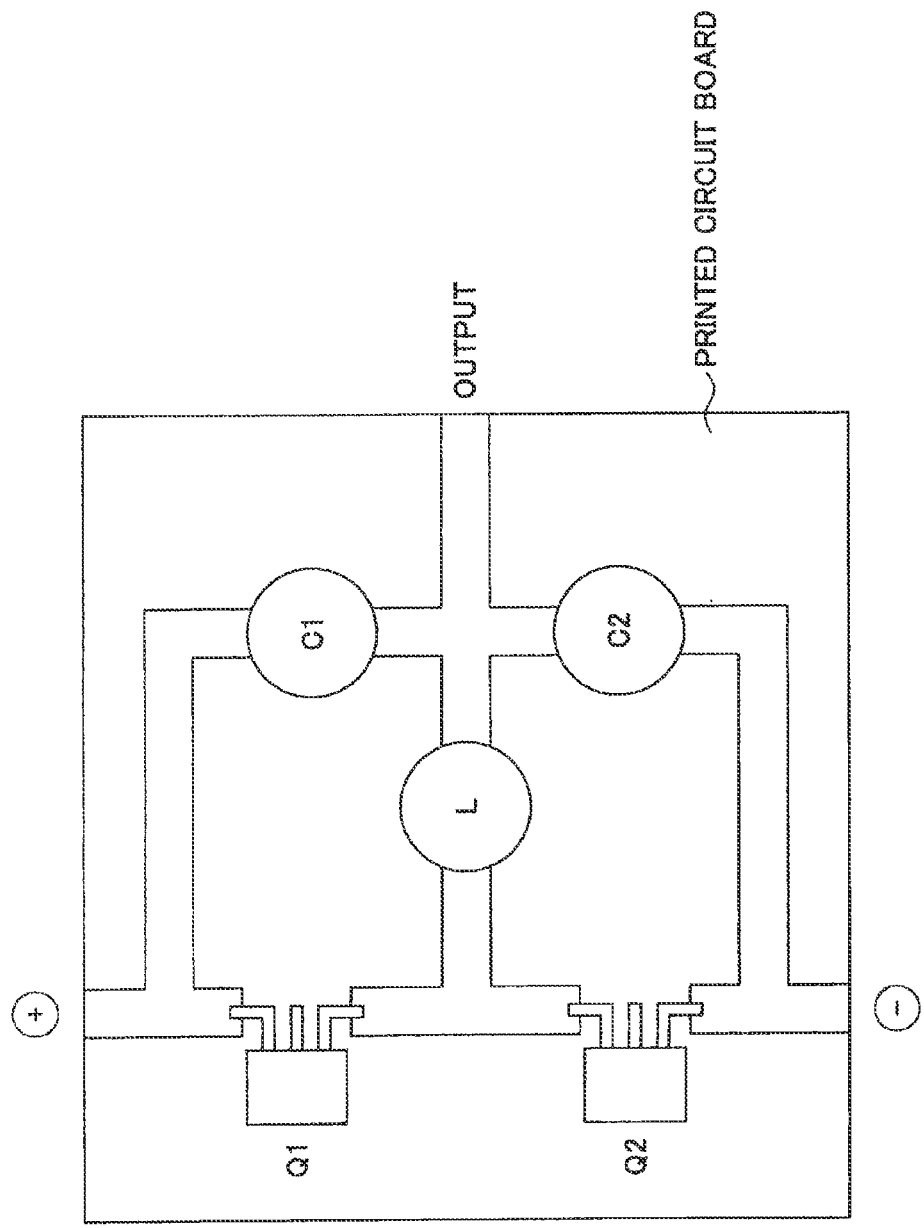
FIG. 2 is a diagram for illustrating an arrangement of parts of the DC-DC converter according to prior art.

Here, as above-mentioned with reference to FIG. 2, if the circuit configuration of the voltage conversion apparatus 1 is disposed in a plane as it is, the magnetic field through the first loop circuit 10 and the magnetic field through the second loop circuit 12 are generated alternately in a short period. This results in a high-frequency noise due to high-frequency variation in the magnetic field.

This embodiment, as described below in detail, enables effectively reducing the noise due to the magnetic field variation generated in the first and second loop circuits 10 and 12 by appropriately disposing the circuit configuration of the voltage conversion apparatus 1. This is described below in detail.

FIG. 5 is a diagram for conceptually illustrating a circuit arrangement of the voltage conversion apparatus 1 according to the embodiment. It is noted that the illustration of the diodes which are disposed in parallel with respect to the switching elements Q1 and Q2 are omitted in FIG. 5 and subsequent some drawings.

In this embodiment, as shown in FIG. 5, with respect to the magnetic fluxes (and thus magnetic fields) generated alternately in connection with the on/off operation of the switching element Q2 (and thus the off/on operation of the switching element Q1 in synchronization with it), a direction of a magnetic flux $\phi 1$ through the first loop circuit 10 is configured to be equal to a direction of a magnetic flux $\phi 2$ through the second loop circuit 12. In other words, the first and second loop circuits 10 and 12 are disposed in such a manner that the first and second loop circuits 10 and 12 are opposed to each other in a direction of the normal to the first and second loop circuits 10 and 12, as shown in FIG. 5. Specifically, the first and second loop circuits 10 and 12 are disposed to be opposed to each other as if the circuit configuration in FIG. 3 were folded along a line X.

FIGS. 6A-E are diagrams of waveshapes for explaining a magnetic flux variation reduction effect in the voltage conversion apparatus 1 which adopts the circuit arrangement shown in FIG. 5.

As mentioned above, when the switching elements Q2 and Q1 are driven with a predetermined duty, the current passes through the second and first loop circuits 12 and 10 with waveshapes as shown in FIGS. 6A and 6B. At that time, because of the current passing through the second and first loop circuits 12 and 10, the magnetic flux $\phi 2$ through the second loop circuit 12 and the magnetic flux $\phi 1$ through the first loop circuit 10 are generated with waveshapes (time series) as shown in FIGS. 6C and 6D. Each of the magnetic flux $\phi 2$ and the magnetic flux $\phi 1$ varies greatly in a short time period because the switching elements Q2 and Q1 are driven at high speed. According to the embodiment, the directions of the magnetic flux $\phi 2$ and the magnetic flux $\phi 1$ shown in FIG. 6C and FIG. 6D are the same. Thus, when these waveshapes (time series) are superposed, the waveshape without a steep variation is obtained as shown in FIG. 6E. In other words, a reduced variation in a magnetic flux is implemented. In this way, according to the voltage conversion apparatus 1, it is possible to effectively reduce a noise generated by a high-frequency variation in a magnetic flux $\phi 1+\phi 2$.

Figure 7:
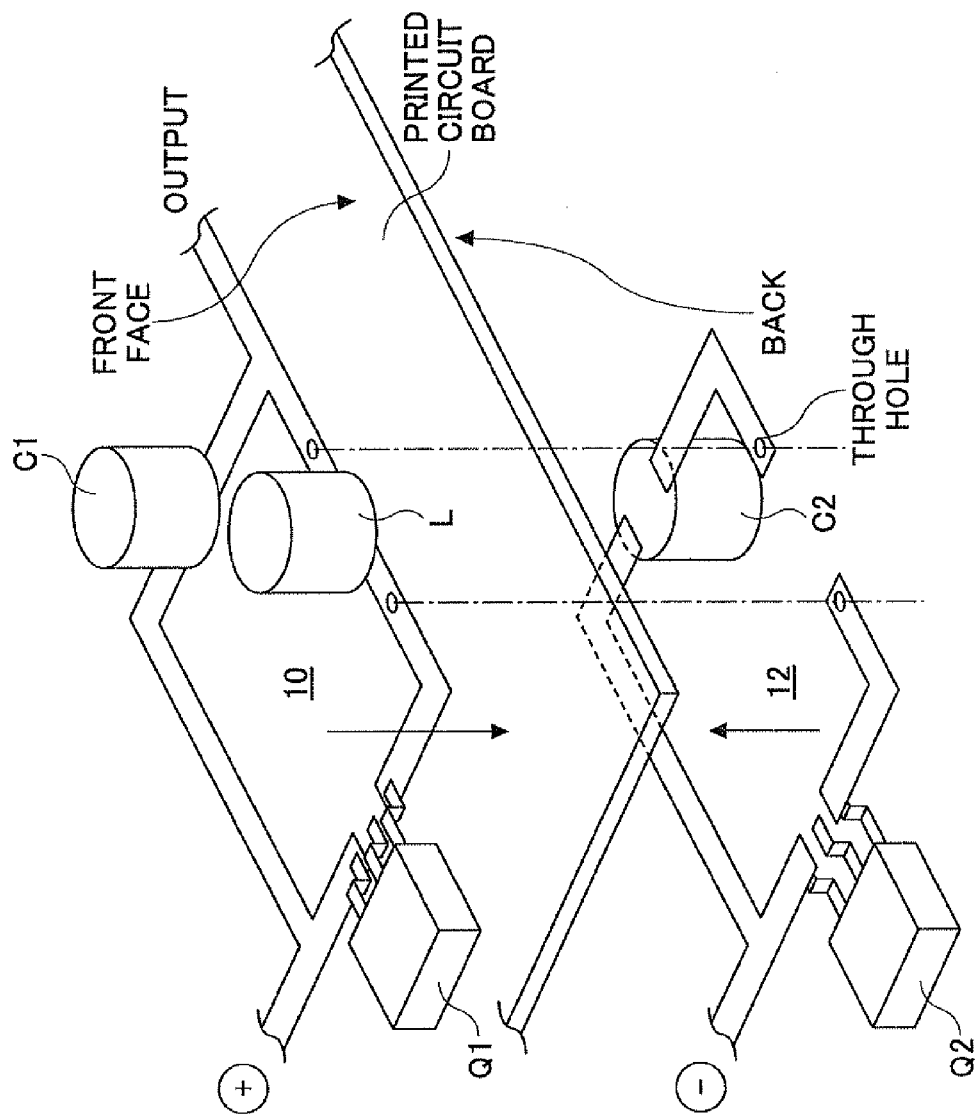
FIG. 7 is a diagram for illustrating a concrete example for implementation of the circuit arrangement of the voltage conversion apparatus 1 according to the embodiment.

FIG. 7 is a diagram for illustrating a concrete example for implementation of the circuit arrangement of the voltage conversion apparatus 1 according to the embodiment.

In the example shown in FIG. 7, the first loop circuit 10 is disposed on one side (a front face in this example) of a printed circuit board and the second loop circuit 12 is disposed on the other side (a back face in this example) of the same printed circuit board. It is noted that the inductance L may be disposed on any side of the printed circuit board and be shared among the first and second loop circuits 10 and 12 via a through hole. In this example, the inductance L is disposed on a front face of the printed circuit board together with other main components of the first loop circuit 10 and is connected to the second loop circuit 12 via a through hole.

Figure 9:
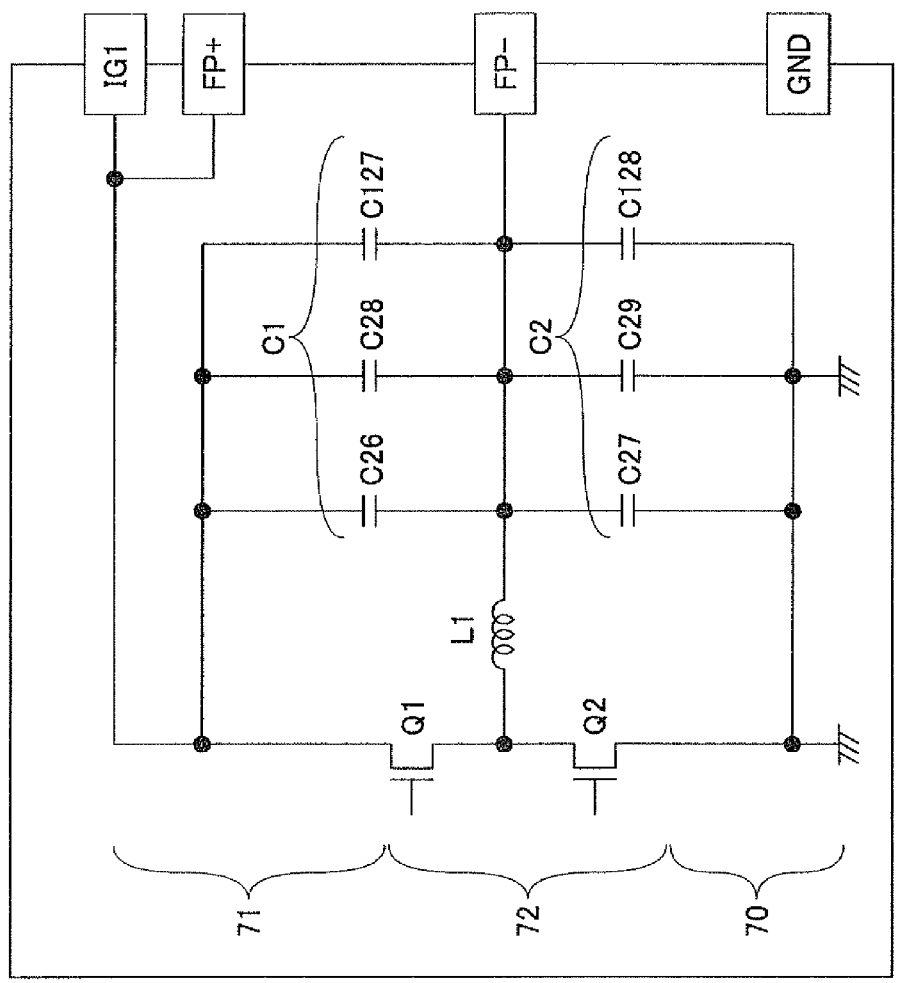
FIG. 9 is a diagram for illustrating the respective portions of the circuit of the voltage conversion apparatus 1 corresponding to the respective hatched regions shown in FIGS. 8A and 8B.

FIGS. 8A and 8B are diagrams for more specifically illustrating the concrete example shown in FIG. 7. FIG. 8A shows a configuration of the front face of the printed circuit board and FIG. 8B shows a configuration of the back face of the printed circuit board. In FIGS. 8A and 8B, the respective portions with hatching indicated by reference numeral 70 corresponds to the portion of the circuit indicated by reference numeral 70 in FIG. 9, the respective portions with hatching indicated by reference numeral 71 corresponds to the portion of the circuit indicated by reference numeral 71 in FIG. 9, and the respective portions with hatching indicated by reference numeral 72 corresponds to the portion of the circuit indicated by reference numeral 72 in FIG. 9. It is noted that, as appreciated from FIGS. 8A and 8B, in a real implementation, a portion of the components of the first loop circuit 10 (a wiring pattern, in particular) and/or a portion of the components of the second loop circuit 12 (a wiring pattern, in particular) may be disposed on other sides of the printed circuit board. For example, as shown in FIGS. 8A and 8B, a portion of a wiring pattern of the first loop circuit 10 may be disposed on the front face of the printed circuit board and a portion of a wiring pattern of the second loop circuit 12 may be disposed on the back face of the printed circuit board.

Figure 10:
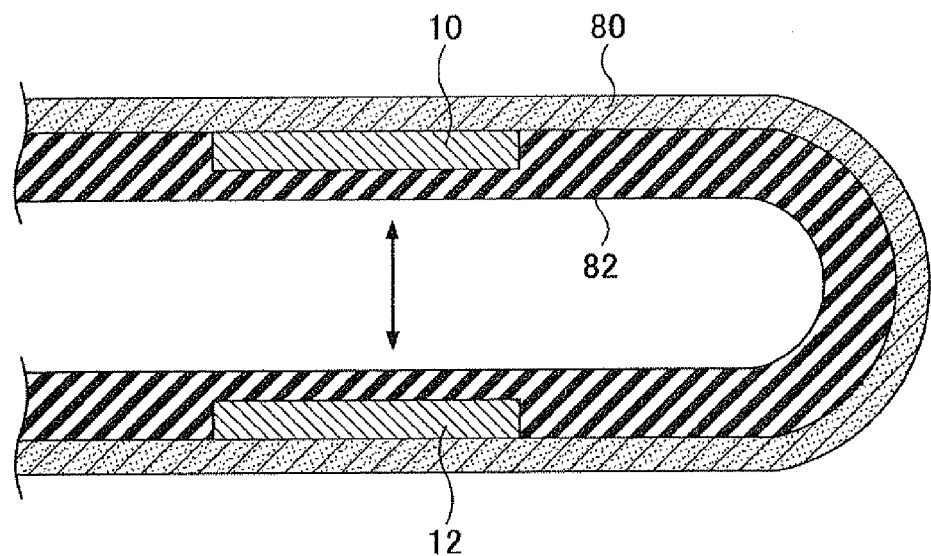
FIG. 10 is a diagram for illustrating another concrete example for implementation of the circuit arrangement of the voltage conversion apparatus 1 according to the embodiment.

FIG. 10 is a diagram for illustrating another concrete example for implementation of the circuit arrangement of the voltage conversion apparatus 1 according to the embodiment.

In the example shown in FIG. 10, the first and second loop circuits 10 and 12 are disposed to be opposed to each other by folding a flexible printed circuit 80 on which the first and second loop circuits 10 and 12 are formed. In this way, the first and second loop circuits 10 and 12 are disposed in such a manner that the first and second loop circuits 10 and are opposed to each other in a direction of the normal to the first and second loop circuits 10 and 12. An insulating layer 82 is formed on the flexible printed circuit 80 in such a manner that the first and second loop circuits 10 and 12 are covered with the insulating layer 82. In this way, electrical insulation between the first and second loop circuits 10 and 12 (between the positive terminal and the negative terminal, in particular) is ensured. It is noted that in the example shown in FIG. 10, as is the case with the example shown in FIG. 7, the inductance L may be disposed in any one of the first and second loop circuits 10 and 12 and be shared among the first and second loop circuits 10 and 12 via a through hole.

Figure 11:
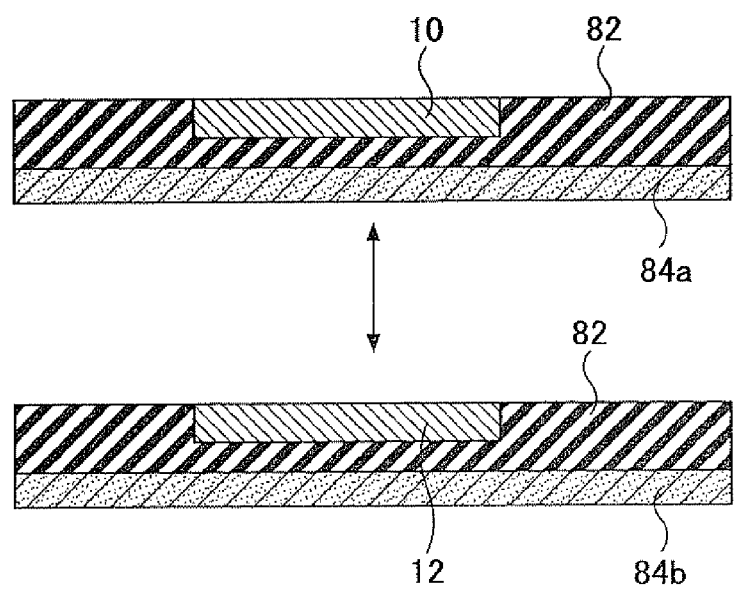
FIG. 11 is a diagram for illustrating another concrete example for implementation of the circuit arrangement of the voltage conversion apparatus 1 according to the embodiment.

FIG. 11 is a diagram for illustrating another concrete example for implementation of the circuit arrangement of the voltage conversion apparatus 1 according to the embodiment.

In the example shown in FIG. 11, the first and second loop circuits 10 and 12 are disposed to be opposed to each other by stacking two boards 84a and 84b on which the first and second loop circuits 10 and (except for a shared portion) are formed, respectively. In this way, the first and second loop circuits 10 and 12 are disposed in such a manner that the first and second loop circuits 10 and 12 are opposed to each other in a direction of the normal to the first and second loop circuits 10 and 12. Insulating layers 82 are formed on the boards 84a and 84b in such a manner that the first and second loop circuits 10 and 12 are covered with insulating layers 82, respectively. In this way, electrical insulation between the first and second loop circuits 10 and 12 is ensured. It is noted that in the example shown in FIG. 11, as is the case with the example shown in FIG. 7, the inductance L may be disposed in any one of the first and second loop circuits 10 and 12 and be shared among the first and second loop circuits 10 and 12 via a through hole (for example, a through hole in the board 84a and the insulating layers 82). The board 84a and 84b may be an ordinary printed circuit board or a flexible printed circuit.

In the example shown in FIG. 11, two boards 84a and 84b on which the first and second loop circuits 10 and 12 are formed, respectively, are stacked in such a manner that two boards 84a and 84b are adjacent to each other. However, other layers may be interposed between the boards 84a and 84b. Further, boards other than the boards 84a and 84b may be provided. For example, a board whose front face or back face has a solid pattern of a copper formed thereon may be provided on the upper side of the board 84a or the lower side of the board 84b so as to improve noise shielding characteristics.

Figure 12:
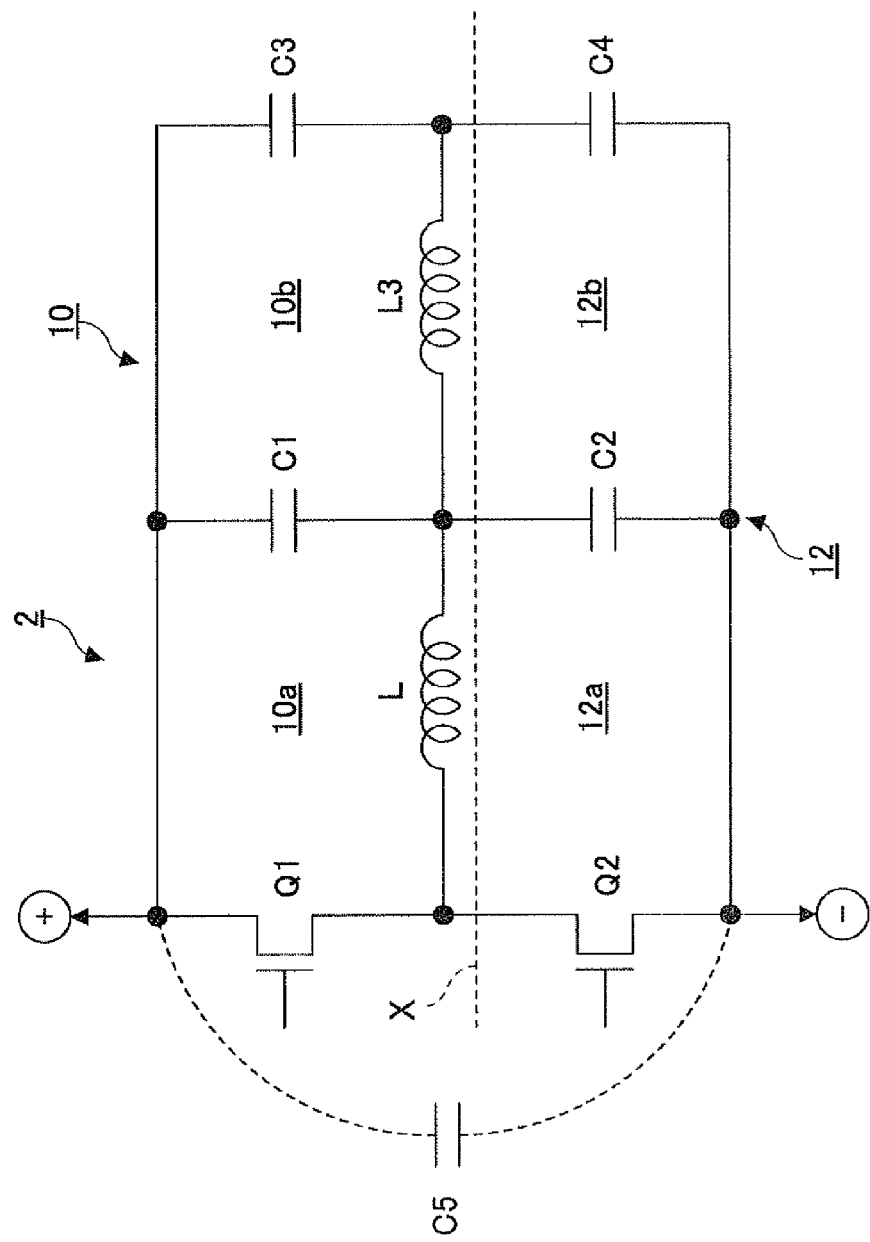
FIG. 12 is a diagram for illustrating a configuration of a voltage conversion apparatus 2 according to another embodiment.

FIG. 12 is a diagram for illustrating a configuration of a voltage conversion apparatus 2 according to another embodiment.

In the voltage conversion apparatus 2 shown in FIG. 12, in order to make the same amount of the current pass through the first and second loop circuits 10 and 12, a capacitor C5 between the positive terminal and the negative terminal is not provided, and a capacitor C4 as an output filter is not provided singly. Instead of this, capacitor C3 and C4 whose capacitances are the same are provided in a symmetrical manner. In other words, the capacitor C3 and C4 are provided for the first and second loop circuits 10 and 12 and in parallel with respect to the capacitor C1 and C2, respectively. Further, an inductance L3 is provided between the inductance L and the output terminal 20. The inductance L3 is provided between a midpoint between the capacitor C1 and C2 and a midpoint between the capacitor C3 and C4. The inductance L3 is provided in series with respect to the inductance L. In this way, the first loop circuit 10 is formed by two loops 10a and 10b and the second loop circuit 12 is formed by two loops 12a and 12b. It is noted that in the example shown in FIG. 12, one set of the capacitors C3, C4 and the inductance L4 is added; however, more sets may be added.

In the example shown in FIG. 12, the first and second loop circuits 10 and 12 are disposed in such a manner that the first and second loop circuits 10 and 12 are opposed to each other in a direction of the normal to the first and second loop circuits 10 and 12. In other words, the respective loops 10a and 10b forming the first loop circuit 10 and the respective loops 12a and 12b forming the second loop circuit 12 are disposed to be opposed to each other as if the circuit configuration in FIG. 12 were folded along a line X. In this way, a reduced variation in a magnetic flux is implemented, and a noise can be effectively reduced, as mentioned above.

Figure 13:
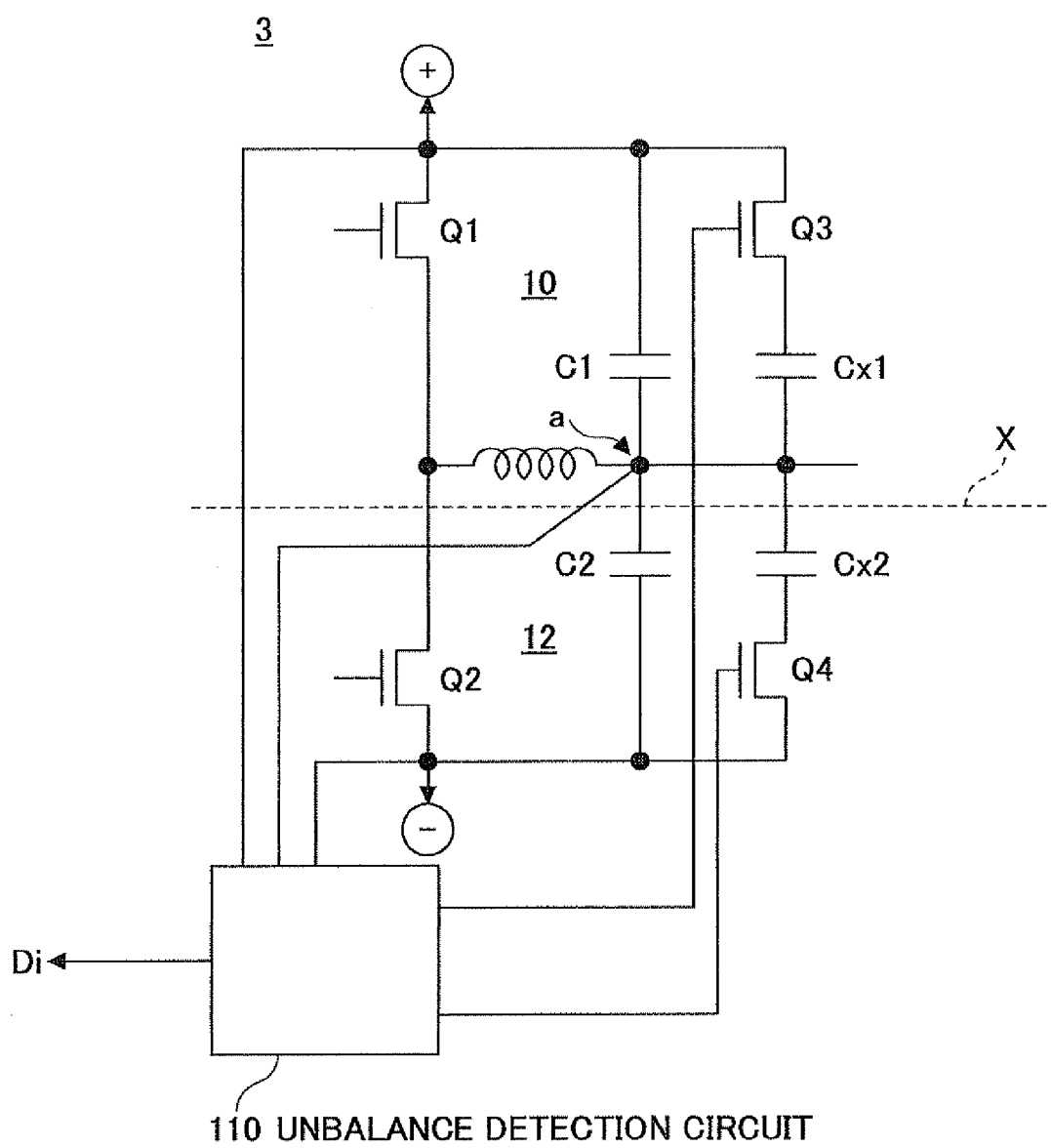
FIG. 13 is a diagram for illustrating a configuration of a voltage conversion apparatus 3 according to another embodiment.

FIG. 13 is a diagram for illustrating a configuration of a voltage conversion apparatus 3 according to another embodiment. In the example shown in FIG. 13, the first and second loop circuits 10 and 12 are disposed in such a manner that the first and second loop circuits 10 and 12 are opposed to each other in a direction of the normal to the first and second loop circuits 10 and 12. Specifically, the first and second loop circuits 10 and 12 are disposed to be opposed to each other as if the circuit configuration in FIG. 13 were folded along a line X. In this way, a reduced variation in a magnetic flux is implemented, and a noise can be effectively reduced, as mentioned above.

In the voltage conversion apparatus 3, correcting capacitors Cx1 and Cx2 are provided for the first and second loop circuits 10 and 12, respectively, in order to compensate for unbalance between the capacitances of the capacitors C1 and C2 of the first and second loop circuits 10 and 12. The correcting capacitors Cx1 and Cx2 are provided in parallel with respect to the capacitors C1 and C2, respectively. The capacitances of the correcting capacitors Cx1 and Cx2 are set to the same value. The capacitances of the correcting capacitors Cx1 and Cx2 may be a few tens percent (20 percent in this example) of the capacitances of the capacitors C1 and C2. Further, switching elements Q3 and Q4 for switching on/off the functions of the correcting capacitors Cx1 and Cx2 are provided for the first and second loop circuits 10 and 12, respectively. The switching elements Q3 and Q4 are provided in series with respect to the correcting capacitors Cx1 and Cx2, respectively. The on/off operation of the switching elements Q3 and Q4 are controlled by an unbalance detection circuit 110. To the unbalance detection circuit 110 are input a voltage VB from the positive terminal and a voltage Va at a midpoint (a) between the capacitors C1 and C2.

Figure 14:
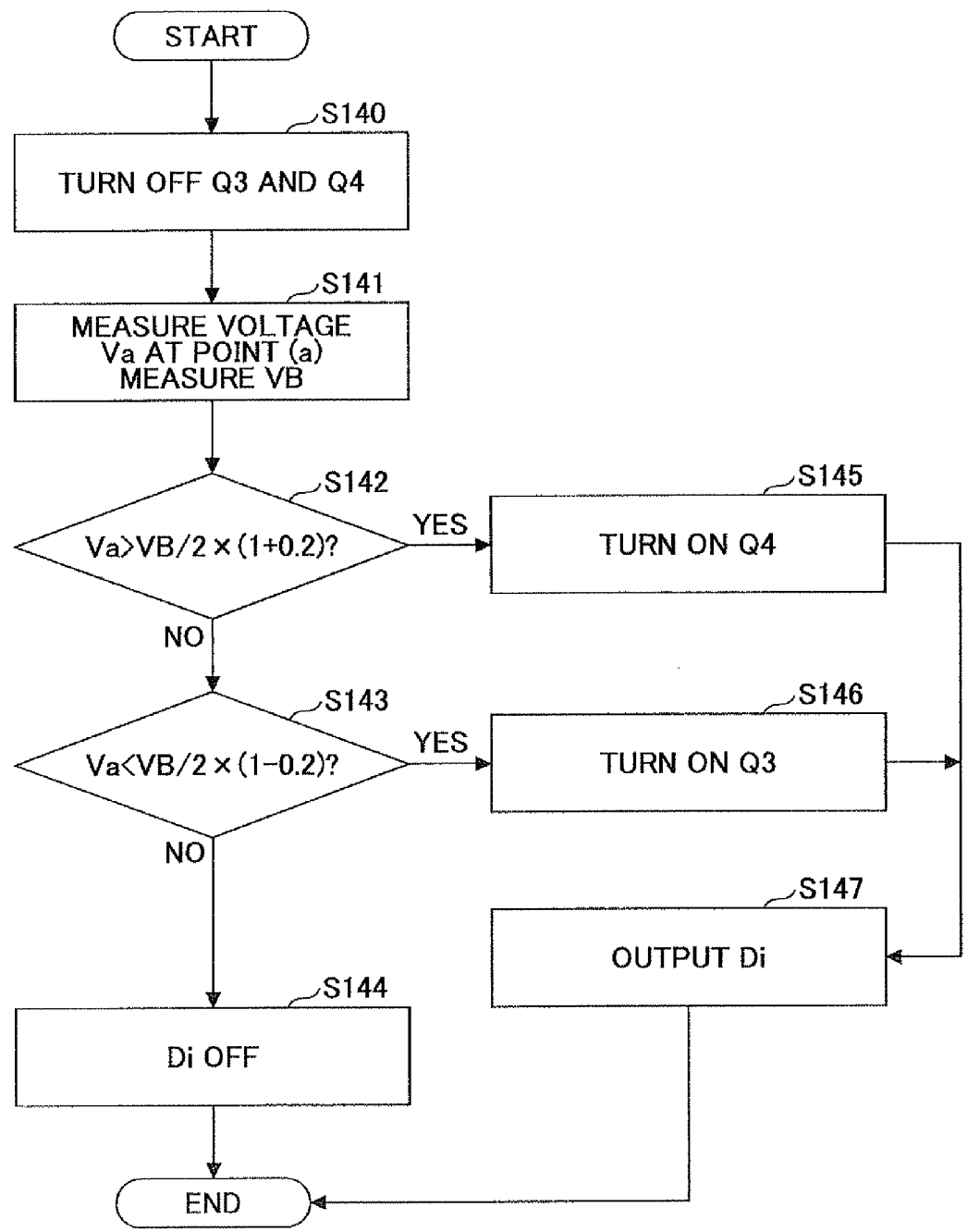
FIG. 14 is a flowchart of control for implementing a capacitance correction using correcting capacitors Cx1 and Cx2.

FIG. 14 is an example of a flowchart of control for implementing a capacitance correction using the correcting capacitors Cx1 and Cx2. The process routine shown in FIG. 14 may be initiated when an ignition switch is turned on, for example.

At step 140, the switching elements Q3 and Q4 of the first and second loop circuits 10 and 12 are turned off.

At step 141, in the unbalance detection circuit 110, the voltage Va at midpoint (a) is measured and the voltage VB is measured.

At step 142, in the unbalance detection circuit 110, it is determined whether Va>VB/2×(1+0.2) based on the result from the step 140. In other words, the voltage Va at midpoint (a) exceeds VB/2 by an error greater than 20 percent. VB/2 is obtained when the capacitances of the capacitors C1 and C2 are equal to each other. It is noted that 20 percent is just one example, and thus percentage of tolerance can be determined as appropriate considering a resistance against a noise. If it is determined that Va>VB/2×(1+0.2), the process routine goes to step 145. On the other hand, if it is determined that Va≤VB/2×(1+0.2), the process routine goes to step 143.

At step 143, in the unbalance detection circuit 110, it is determined whether Va<VB/2×(1+0.2) based on the result from the step 140. In other words, the voltage Va at midpoint (a) is less than VB/2 by an error greater than 20 percent. VB/2 is obtained when the capacitances of the capacitors C1 and C2 are equal to each other. It is noted that 20 percent is just one example, and thus percentage of tolerance can be determined as appropriate considering a resistance against a noise. If it is determined that Va<VB/2×(1+0.2), the process routine goes to step 146. On the other hand, if it is determined that Va≥VB/2×(1+0.2), the process routine goes to step 144.

At step 144, the unbalance detection circuit 110 sets a diagnostics Di for an alarm to an OFF state (or OFF state is maintained). This is because the voltage Va at midpoint (a) is within 20 percent of tolerance with respect to VB/2 which is obtained in the case where the capacitances of the capacitors C1 and C2 are equal to each other.

At step 145, the switching element Q4 is turned on by the unbalance detection circuit 110. Then, the correcting capacitor Cx2 begins to operate, thereby unbalance between the capacitances of the capacitors C1 and C2 is reduced. Specifically, if the switching element Q4 is in its OFF state, the relationship Va=VB×C1/(C1+C2) holds, while if the switching element Q4 is in its ON state, the relationship Va=VB×C1/(C1+C2+Cx2) holds. In this way, Va is corrected to be closer to VB/2. When the process at step 145 is terminated, the process routine goes to step 147.

At step 146, the switching element Q3 is turned on by the unbalance detection circuit 110. Then, the correcting capacitor Cx1 begins to operate, thereby unbalance between the capacitances of the capacitors C1 and C2 is reduced. Specifically, if the switching element Q3 is in its OFF state, the relationship Va=VB×C1/(C1+C2) holds, while if the switching element Q3 is in its ON state, the relationship Va=VB×C1/(C1+C2+Cx1) holds. In this way, Va is corrected to be closer to VB/2. When the process at step 146 is terminated, the process routine goes to step 147.

At step 147, the unbalance detection circuit 110 outputs the diagnostics Di for an alarm. This is because the unbalance between the capacitances of the capacitors C1 and C2 still occurs even though the unbalance is corrected by the function of the correcting capacitor Cx1 or Cx2.

According to the process routine shown in FIG. 14, the unbalance between the capacitances of the capacitors C1 and C2 can be accurately detected by monitoring the voltage Va at midpoint (a) between the capacitors C1 and C2. If intolerable unbalance between the capacitances of the capacitors C1 and C2 is detected, the unbalance is corrected using the correcting capacitor Cx1 or Cx2, and the diagnostics Di, which can urge a user to exchange the capacitors C1 and C2, for example, is output.

Figure 15:
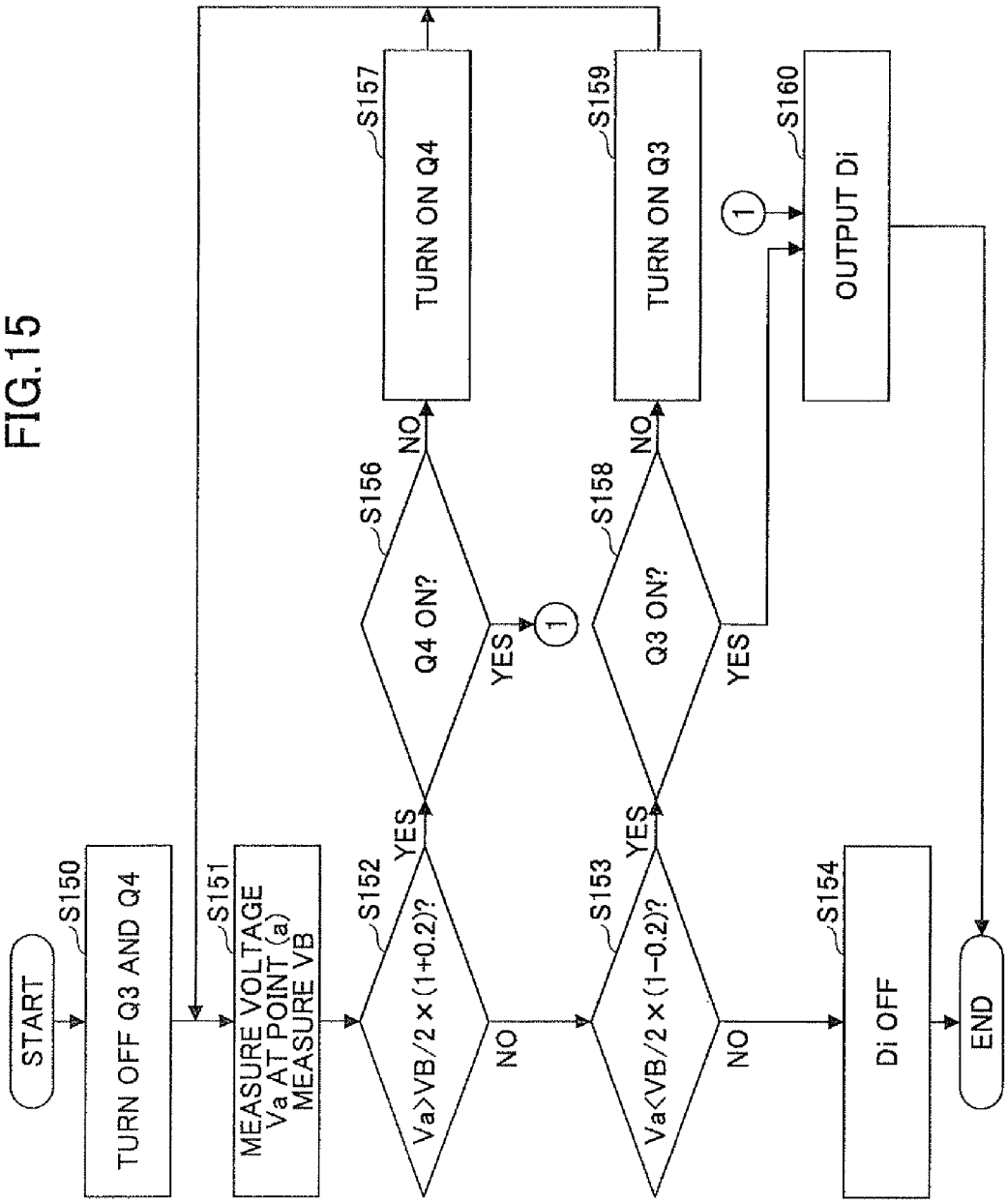
FIG. 15 is another example of a flowchart of control for implementing capacitance correction using correcting capacitors Cx1 and Cx2.

FIG. 15 is another example of a flowchart of control for implementing a capacitance correction using the correcting capacitors Cx1 and Cx2. The process routine shown in FIG. 15 may be initiated when an ignition switch is turned on, for example.

Processes from step 150 to step 154 are substantially the same as the processes from step 140 to step 144 in FIG. 14. Thus, the explanation on the processes from step 150 to step 154 is omitted. If the determination result at step 152 is negative, the process routine goes to step 156, and if the determination result at step 153 is negative, the process routine goes to step 158.

At step 156, the unbalance detection circuit 110 determines whether the switching element Q4 has been turned on. If the switching element Q4 has been turned on already, that is to say, if the correcting capacitor Cx2 is already in operation, the process routine goes to step 160. On the other hand, if the switching element Q4 is in its OFF state, the process routine goes to step 157.

At step 157, the switching element Q4 is turned on by the unbalance detection circuit 110. Then, the correcting capacitor Cx2 begins to operate, thereby unbalance between the capacitances of the capacitors C1 and C2 is reduced. When the process at step 157 is terminated, the process routine returns to step 151.

At step 158, the unbalance detection circuit 110 determines whether the switching element Q4 has been turned on. If the switching element Q3 has been turned on already, that is to say, if the correcting capacitor Cx1 is already in operation, the process routine goes to step 160. On the other hand, if the switching element Q3 is in its OFF state, the process routine goes to step 159.

At step 159, the switching element Q3 is turned on by the unbalance detection circuit 110. Then, the correcting capacitor Cx1 begins to operate, thereby unbalance between the capacitances of the capacitors C1 and C2 is reduced. When the process at step 159 is terminated, the process routine returns to step 151.

At step 160, the unbalance detection circuit 110 outputs the diagnostics Di for an alarm. This is because intolerable unbalance between the capacitances of the capacitors C1 and C2 is still detected even though the unbalance is corrected by the function of the correcting capacitor Cx1 or Cx2.

According to the process routine shown in FIG. 15, the unbalance between the capacitances of the capacitors C1 and C2 can be accurately detected by monitoring the voltage Va at midpoint (a) between the capacitors C1 and C2. If intolerable unbalance between the capacitances of the capacitors C1 and C2 is detected, the unbalance is corrected using the correcting capacitor Cx1 or Cx2. If the intolerable unbalance is still detected in spite of the correction, the diagnostics Di is output, which can urge a user to replace the capacitors C1 and C2, for example.

Figure 16:
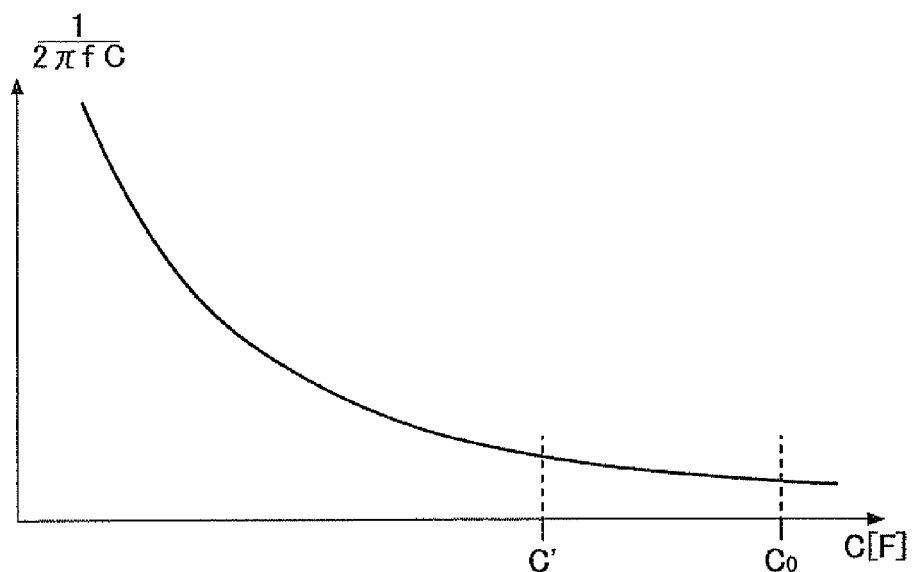
FIG. 16 is a diagram for illustrating a relationship between a resistance component of the capacitor and a capacitance of the capacitor.
Figure 17:
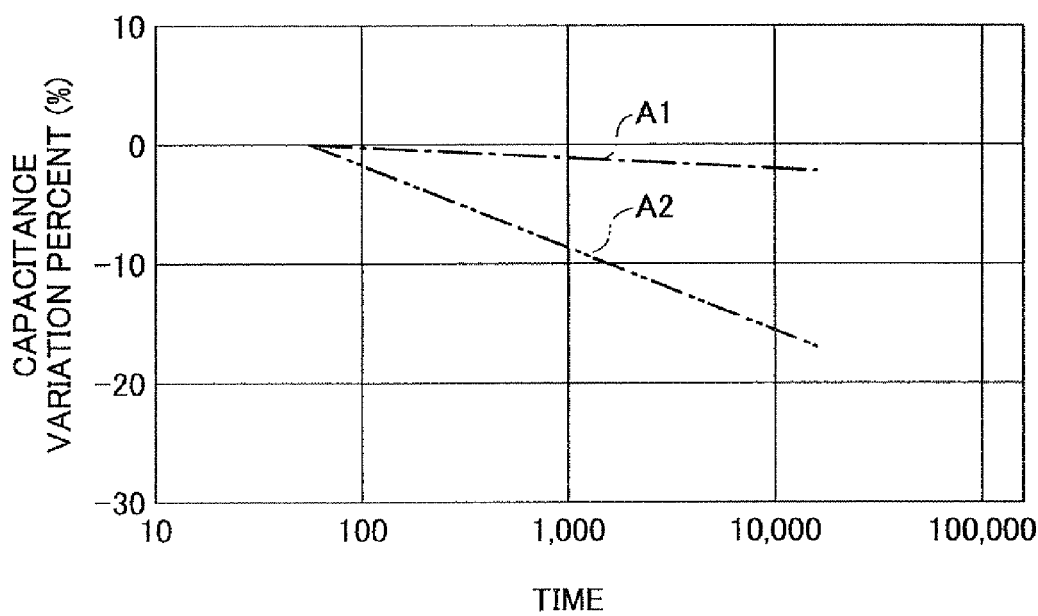
FIG. 17 is a diagram for illustrating characteristics of a capacitor due to aged deterioration.

FIG. 16 is a diagram for illustrating a relationship between a resistance component of the capacitor and a capacitance of the capacitor. Here, a preferred way of setting the capacitances of the capacitors C1 and C2 is described with reference to FIG. 16. As shown in FIG. 16, the resistance component of the capacitor decreases as the capacitance of the capacitor increases. In terms of this fact, the capacitances of the capacitors C1 and C2 are selected such that the resistance components ($=1/2\pi fC$) of the capacitors C1 and C2 don't change greatly even when the capacitances of the capacitors C1 and C2 decrease due to aged deterioration. For example, if the capacitances of the capacitors C1 and C2 whose initial values are C0 decrease to C' after a necessary durability term has passed, the capacitances of the capacitors C1 and C2 are selected such that the amount of change in resistance components ($=1/2\pi fC'-1/2\pi fC0$) is less than a predetermined admissible value. It is noted that the capacitance C' (or change in capacitance) of the capacitors C1 and C2 after a necessary durability term has passed may be derived using a characteristic curve shown in FIG. 17, for example. It is noted that in FIG. 17, characteristics of two types of capacitors are shown by curves A1 and A2.

Figure 18:
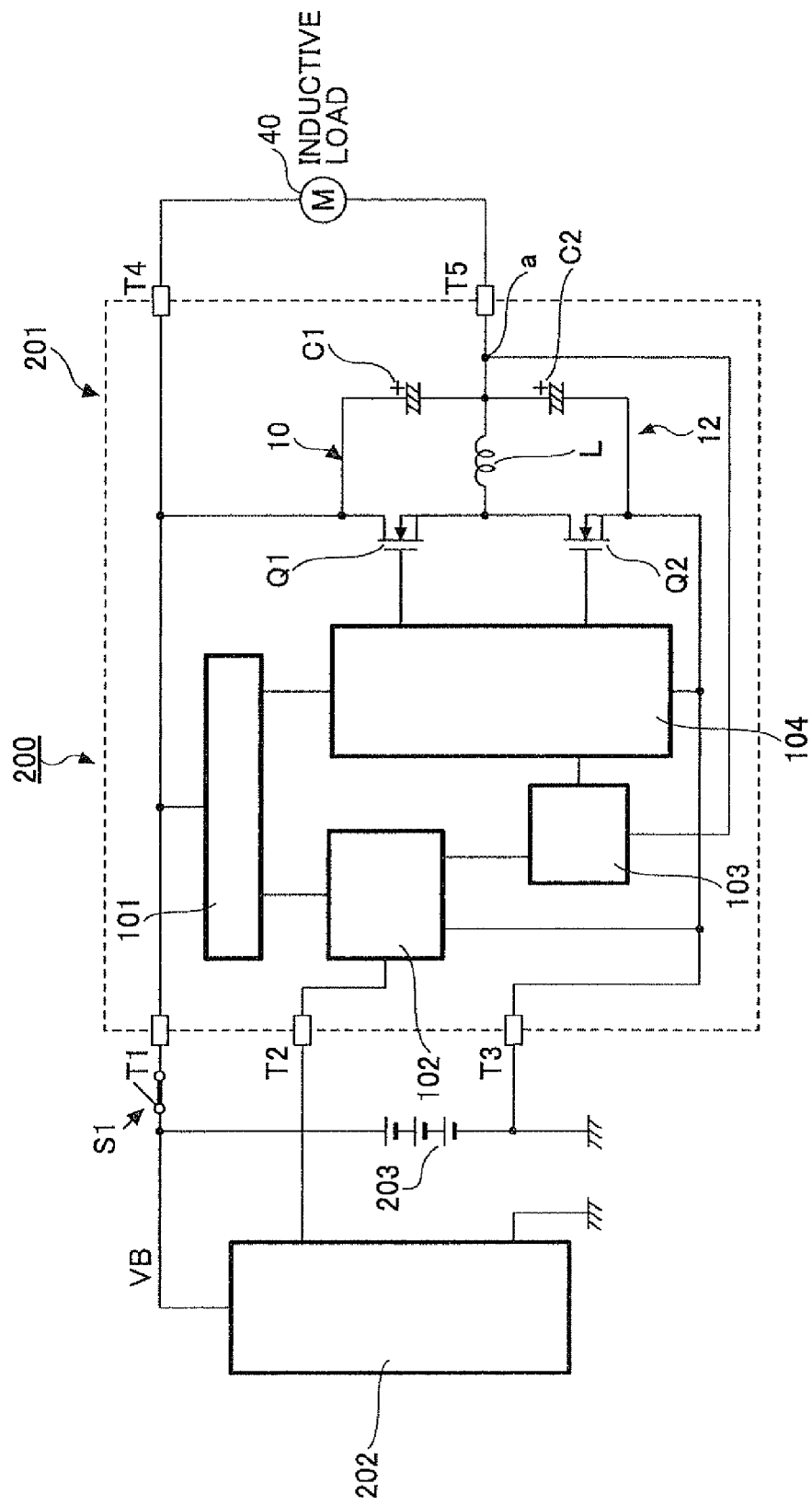
FIG. 18 is a system diagram of an embodiment of an electrical load driving apparatus 200 according to the present invention.

FIG. 18 is a system diagram of an embodiment of an electrical load driving apparatus 200 according to the present invention.

The electrical load driving apparatus 200 according to the embodiment includes an electrical load driving circuit apparatus 201, a control target signal generating apparatus (PCM) 202, and a direct-current power supply 203. The electrical load driving circuit apparatus 201 includes the voltage conversion apparatus 1 as mentioned above, an internal power supply circuit 101, an input signal interface circuit 102, a switching duty generation circuit 103 and a switching element driving circuit 104. It is noted that terminals T1 and T4 correspond to the positive terminal mentioned above, a terminal T3 corresponds to the negative terminal and a terminal T5 corresponds to the output terminal 20 of the voltage conversion apparatus 1. It is noted that the voltage conversion apparatus 2 or 3 according to the above-mentioned other embodiments may be used instead of the voltage conversion apparatus 1.

In the example shown in FIG. 18, the electrical load 40 is an inductive load and a fuel pump used in an engine of a vehicle. However, the electrical load 40 may be an arbitrary electrical load, such as a fan, an assist motor in a steering system, etc. Further, a switch indicated by a reference symbol S1 corresponds to an ignition switch.

The control target signal generating apparatus 202 is constituted by a microcomputer. The control target signal generating apparatus 202 may be an EFI ECU which controls an engine of a vehicle, for example. The control target signal generating apparatus 202 determines a control target value (a target number of revolutions) of the fuel pump and inputs a control target signal representing the determined control target value to the electrical load driving circuit apparatus 201. It is noted that the control target signal generating apparatus 202 operates based on the power supply voltage supplied from the direct-current power supply 203; however, the control target signal generating apparatus 202 may have a step-down transformer circuit or the like therein.

The control target signal from the control target signal generating apparatus 202 is processed in the input signal interface circuit 102. A duty ratio for implementing the control target value is determined by the switching duty generation circuit 103. The switching element driving circuit 104 performs the ON/OFF control of the switching elements Q1 and Q2 according to the determined duty ratio.

Figure 19:
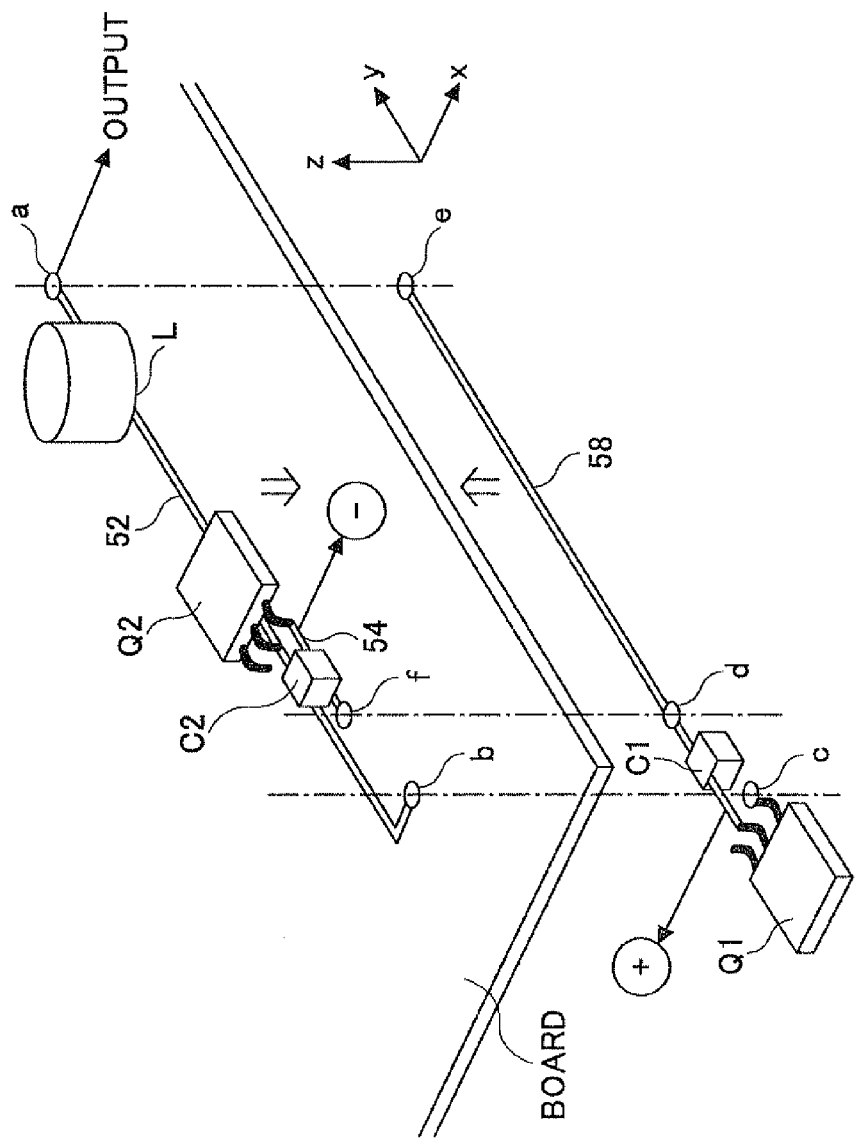
FIG. 19 is a diagram for illustrating another concrete example for implementation of the circuit arrangement of the voltage conversion apparatus 1 according to the embodiment.

FIG. 19 is a diagram for illustrating another concrete example for implementation of the circuit arrangement of the voltage conversion apparatus 1 according to the above-mentioned embodiment.

In the example shown in FIG. 19, as described below in detail, the first and second loop circuits 10 and 12 are formed on a board such that a direction of the normal to the first and second loop circuits 10 and 12 is substantially perpendicular to a cross-section of the board (corresponding to x direction in FIG. 19).

Specifically, on a first face of the board is formed a conductor pattern 52 from point (a) to point (b). The inductance L and the drain of the switching element Q2 are connected to the conductor pattern 52. Further, on the first face of the board is formed a conductor pattern 54 from the source of the switching element Q2 to point (f). The conductor pattern 54 is connected to the capacitor C2. The point (a) is connected to the output terminal 20 (see FIG. 3) as shown schematically in FIG. 19. The negative terminal (see FIG. 3) is connected to the conductor pattern 52 between the capacitor C2 and the source of the switching element Q2.

On a second face of the board is formed a conductor pattern 53 from point (e) to the drain of the switching element Q1. The capacitor C1 is connected to the conductor pattern 53. Further, a point (d) is provided on the conductor pattern 53 between the point (e) and the capacitor C1. The point (d) is opposed to the point (f) on the first face of the board. The point (d) is connected to the point (f) via a through hole. Further, the source of the switching element Q1 is disposed to be opposed to the point (b) on the first face of the board. The source of the switching element Q1 is connected to the conductor pattern 52 at point (b) via a through hole. Further, the point (e) on the second face is opposed to the point (a) on the first face and is connected to the point (a) via a through hole. The positive terminal (see FIG. 3) is connected to the conductor pattern 58 between the capacitor C1 and the drain of the switching element Q1.

In this way, the circuit arrangement according to the above-mentioned embodiment shown in FIG. 3 is implemented in the board. It is noted that this circuit structure is formed in a direction perpendicular to the board, and thus can be formed in a semiconductor manufacturing process. Further, since the circuit structure can be implemented by merely forming the conductor patterns on the first and second faces of the board and disposing the respective elements L, Q1, Q2, C1 and C2, it is very easy to manufacture it. Further, the structure shown in FIG. 19 can be implemented using a small area of the board, as is apparent when comparing it with the example shown in FIG. 7.

Here, in the example shown in FIG. 19, the first loop circuit 10 includes the drain of the switching element Q1, the conductor pattern 58 connecting the capacitor C1 and the point (e), the through hole from the point (e) to the point (a), the conductor pattern 52 from the point (a) to the point (b) via the inductance L, and the through hole from the point (b) to the source of the switching element Q1. Since the first loop circuit 10 is formed substantially in the cross-section of the board, the direction of the normal to the first loop circuit 10 is substantially perpendicular to the cross-section of the board (corresponding to x direction in FIG. 19).

Similarly, the second loop circuit 12 includes the conductor pattern 54 from the source of the switching element Q2 to the point (f) via the capacitor C2, the through hole from the point (f) to the point (d), a portion of the conductor pattern 58 from the point (d) to the point (e), the through hole from the point (e) to the point (a), and a portion of the conductor pattern 52 from the point (a) to the drain of the switching element Q2 via the inductance L. As is the case with the first loop circuit 10, since the second loop circuit 12 is formed substantially in the cross-section of the board, the direction of the normal to the second loop circuit 12 is substantially perpendicular to the cross-section of the board (corresponding to x direction in FIG. 19).

Therefore, in the example shown in FIG. 19, with respect to the magnetic fluxes (and thus magnetic fields) generated alternately in connection with the on/off operation of the switching element Q2 (and thus the off/on operation of the switching element Q1 in synchronization with it), a direction of a magnetic flux $\phi 1$ through the first loop circuit 10 is configured to be equal to a direction of a magnetic flux $\phi 2$ through the second loop circuit 12. In other words, the first and second loop circuits 10 and 12 are disposed in such a manner that the first and second loop circuits 10 and 12 are opposed to each other in a direction of the normal to the first and second loop circuits 10 and 12. In this way, as mentioned above, it is possible to effectively reduce a noise generated by a high-frequency variation in a magnetic flux $\phi 1 + \phi 2$. Further, according to the example shown in FIG. 19, since the first and second loop circuits 10 and 12 are formed substantially in the cross-section of the board, it is possible to make an area of first and second loop circuits 10 and 12 smaller, and thus reduce magnitude of the magnetic fields generated in the first and second loop circuits 10 and 12, respectively. Further, according to the example shown in FIG. 19, a proportion of an opposed area of the respective loop areas of the first and second loop circuits 10 and 12 can be larger, with respect to the structure in which the first and second loop circuits 10 and 12 are opposed to each other in a direction perpendicular to the surface of the board as shown in FIG. 7. This is because the possibility that the opposed area (or a proportion of an opposed area) becomes small due to constraints of parts arrangement, etc., is low according to the structure shown in FIG. 19. In this way, according to the example shown in FIG. 19, it is possible to reduce generation of a noise easily with respect to the example shown in FIG. 7.

It is noted that in the example shown in FIG. 19, it is possible to make an electrically equivalent modification to the positions of the respective elements L, Q1, Q2, C1 and C2, the positions of the respective conductor patterns 52, 54 and 58, etc. For example, the inductance L may be provided on the second face of the board instead of the first face of the board. In this case, the inductance L may be disposed in the conductor pattern 58 between the point (e) and the point (d).

The present invention is disclosed with reference to the preferred embodiments. However, it should be understood that the present invention is not limited to the above-described embodiments, and variations and modifications may be made without departing from the scope of the present invention.

For example, in FIG. 5, the example is conceptually shown in which the first and second loop circuits 10 and 12 have the same loop area (i.e., the area through which the magnetic flux passes) and the respective loops of the first and second loop circuits 10 and 12 are opposed to each other with their overall areas. It is preferred that the respective loop areas of the first and second loop circuits 10 and 12 are the same; however, they are not necessarily the same if there are constraints in a real implementation, for example. Further, similarly, it is preferred that the opposed area (or a proportion of the opposed area) of the respective loop areas of the first and second loop circuits 10 and 12 are large; however, the respective loop areas of the first and second loop circuits 10 and 12 may be partly opposed to each other.

Further, it is also possible to have the ends of the patterns of the first and second loop circuits 10 and 12 have a radius (a rounded corner) so as to prevent emission of the noise by removing sharp edges.

Further, it is also possible to form the first and second loop circuits 10 and 12 using not only the printed circuit board but also a core wire of a shielding wire. In this case, by using a meshed wire of the shielding wire as a path of magnetic lines of force, it becomes possible to prevent the magnetic lines of force from radiating toward other circuit portions.

Further, when a portion in which the positive terminal and the negative terminal (i.e., the ground terminal in this example) are opposed to each other is located near the edge of the printed circuit board, the possibility of short becomes high. In order to prevent the short, it is possible to add a coating of insulation. For example, the edge of the printed circuit board may be twice-coated or dip brazed with insulation. Further, from the similar viewpoint, it is also possible to locate the portion in which the positive terminal and the negative terminal are opposed to each other at the center of the printed circuit board so as to increase a creepage distance. Further, it is also possible to have the through hole located farther from the portion in which the positive terminal and the negative terminal are opposed to each other.

Further, in the example shown in FIG. 13 the correcting capacitors Cx1 and Cx2 may be variable capacitance capacitors. In this case, the capacitances of the correcting capacitors Cx1 and Cx2 may be adjusted such that the voltage Va at midpoint (a) becomes VB/2.

Further, although in the above-mentioned embodiments a step-down type of the voltage conversion apparatus is used, a step-up type or bidirectional type of the voltage conversion apparatus may be used.

The present application is based on Japanese Priority Application No. 2008-231527, filed on Sep. 9, 2008, the entire contents of which are hereby incorporated by reference.

The invention claimed is:

1. A voltage conversion apparatus having a first loop circuit and a second loop circuit which share an inductance component, in which a current passes through the first and second loop circuits alternately in accordance with an ON/OFF operation of a first switching element provided in the first loop circuit to produce a first and second area through which magnetic flux passes, wherein the first and second loop circuits are disposed in such a manner that the first and second areas through which magnetic flux passes are at least partly opposed, and a direction of a magnetic field through the first loop circuit generated at the ON operation of the first switching element in the first loop circuit is the same as a direction of a magnetic field through the second loop circuit generated at the OFF operation of the first switching element in the first loop circuit subsequent to the ON operation, the first switching element and the inductance component are disposed on a first plane where the first loop circuit is formed, the second switching element is disposed on a second plane where the second loop circuit is formed, the second plane being offset with respect to the first plane in a direction of the magnetic flux, the first plane being separate from the second plane such that the first and second loop circuits are provided on a front face and a back face of a common circuit board, respectively, or provided on a back face and a front face of a common circuit board, respectively, the first and second loop circuits are provided on a common surface of a common circuit board, and the common circuit board is folded in such a manner that the first and second loop circuits are opposed to each other in a direction of the normal to the respective loop circuits, and the opposed side of each of the first and second loop circuits is covered with an insulating layer.

2. The voltage conversion apparatus as claimed in claim 1, wherein a second switching element is provided in the second loop circuit, and the first and second switching elements are controlled in such a synchronized manner that one of the switching elements turns off when the other switching element turns on.

3. The voltage conversion apparatus as claimed in claim 1, wherein the first and second loop circuits are formed on a board in such a manner that a normal direction of each of the loop circuits is substantially perpendicular to a cross-section of the board.

4. The voltage conversion apparatus as claimed in claim 1, wherein first and second capacitors are provided in the first and second loop circuits, respectively.

5. A voltage conversion apparatus having a first loop circuit and a second loop circuit which share an inductance component, in which a current passes through the first and second loop circuits alternately in accordance with an ON/OFF operation of a first switching element provided in the first loop circuit to produce a first and second area through which magnetic flux passes, wherein the first and second loop circuits are disposed in such a manner that the first and second areas through which magnetic flux passes are at least partly opposed, and a direction of a magnetic field through the first loop circuit generated at the ON operation of the first switching element in the first loop circuit is the same as a direction of a magnetic field through the second loop circuit generated at the OFF operation of the first switching element in the first loop circuit subsequent to the ON operation, the first switching element and the inductance component are disposed on a first plane where the first loop circuit is formed, the first switching element and the inductance component are disposed on a first plane where the first loop circuit is formed, the second switching element is disposed on a second plane where the second loop circuit is formed, the second plane being offset with respect to the first plane in a direction of the magnetic flux, the first plane being separate from the second plane such that the first and second loop circuits are provided on a front face and a back face of a common circuit board, respectively, or provided on a back face and a front face of a common circuit board, respectively, first and second capacitors are provided in the first and second loop circuits, respectively, and first and second adjusting capacitors are provided for the first and second loop circuits, respectively, in such a manner that an amount of current passing through the first loop circuit at the ON operation of the first switching element in the first loop circuit becomes equal to an amount of current passing through the second loop circuit at the OFF operation of the first switching element in the first loop circuit.

6. A voltage conversion apparatus having a first loop circuit and a second loop circuit which share an inductance component, in which a current passes through the first and second loop circuits alternately in accordance with an ON/OFF operation of a first switching element provided in the first loop circuit to produce a first and second area through which magnetic flux passes, wherein the first and second loop circuits are disposed in such a manner that the first and second areas through which magnetic flux passes are at least partly opposed, and a direction of a magnetic field through the first loop circuit generated at the ON operation of the first switching element in the first loop circuit is the same as a direction of a magnetic field through the second loop circuit generated at the OFF operation of the first switching element in the first loop circuit subsequent to the ON operation, the first switching element and the inductance component are disposed on a first plane where the first loop circuit is formed, the second switching element is disposed on a second plane where the second loop circuit is formed, the second plane being offset with respect to the first plane in a direction of the magnetic flux, the first plane being separate from the second plane such that the first and second loop circuits are provided on a front face and a back face of a common circuit board, respectively, or provided on a back face and a front face of a common circuit board, respectively, and first and second capacitors are provided in the first and second loop circuits, the voltage conversion apparatus further comprising: a sensor for detecting a potential between the first and second capacitors, and capacitance correcting means for correcting a capacitance of at least one of the first and second capacitors according to an output of the sensor.

7. The voltage conversion apparatus as claimed in claim 5, wherein capacitances of the first and second capacitors are set in such a manner that variations in resistance components of the first and second capacitors are below a predetermined value.

8. An electrical load driving apparatus for driving an electrical load, comprising:
    a direct-current power supply;
    the voltage conversion apparatus as claimed in claim 2, the voltage conversion apparatus being configured to convert a level of a voltage from the direct-current power supply and output the converted voltage to the electrical load; and
    a controller configured to control the voltage conversion apparatus.

9. The voltage conversion apparatus as claimed in claim 1, wherein the first and second loop circuits are disposed in such a manner that the areas through magnetic flux passes are opposed.

10. The voltage conversion apparatus as claimed in claim 6, wherein capacitances of the first and second capacitors are set in such a manner that variations in resistance components of the first and second capacitors are below a predetermined value.

\* \* \* \* \*